(12) United States Patent
Yatsu

(10) Patent No.: US 9,581,795 B2
(45) Date of Patent: Feb. 28, 2017

(54) PROJECTION-TYPE VIDEO DISPLAY DEVICE

(71) Applicant: Hitachi Maxell, Ltd., Osaka (JP)

(72) Inventor: Masahiko Yatsu, Ibaraki (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

(21) Appl. No.: 14/786,944

(22) PCT Filed: Apr. 24, 2013

(86) PCT No.: PCT/JP2013/061967
§ 371 (c)(1),
(2) Date: Oct. 23, 2015

(87) PCT Pub. No.: WO2014/174600
PCT Pub. Date: Oct. 30, 2014

(65) Prior Publication Data
US 2016/0077319 A1    Mar. 17, 2016

(51) Int. Cl.
*G03B 21/28* (2006.01)
*G02B 17/08* (2006.01)
(Continued)

(52) U.S. Cl.
CPC ......... *G02B 17/0852* (2013.01); *G02B 13/006* (2013.01); *G02B 13/0045* (2013.01);
(Continued)

(58) Field of Classification Search
CPC ..... G02B 9/64; G02B 13/0045; G02B 13/006; G03B 21/142; G03B 21/28
(Continued)

(56) References Cited

U.S. PATENT DOCUMENTS

2007/0291236 A1    12/2007  Hirata et al.
2008/0100927 A1    5/2008   Hisada et al.
(Continued)

FOREIGN PATENT DOCUMENTS

JP    2007-334052 A    12/2007
JP    2008-009223 A    1/2008
(Continued)

OTHER PUBLICATIONS

International Search Report PCT/JP2013/061967 dated Aug. 20, 2013 with English translation.

*Primary Examiner* — William C Dowling
(74) *Attorney, Agent, or Firm* — McDermott Will & Emery LLP

(57) ABSTRACT

Provided is a projection-type video display device implementing further reduction of a projection distance and further miniaturization of a projection optical system. The projection-type video display device includes a lens group which includes a plurality of lenses, a free-form-surface lens, and a free-form-surface mirror which projects light from the free-form-surface lens on a screen, wherein the lens group includes a third lens which has a bi-convex shape, a fourth lens which has a bi-concave shape, a fifth lens which has a bi-convex shape, the third to fifth lenses constitute a triplet lens, and wherein the free-form-surface lens has a meniscus lens shape of which a convex surface is oriented toward the magnification side.

5 Claims, 23 Drawing Sheets

(51) Int. Cl.
  *G02B 13/04* (2006.01)
  *G02B 13/00* (2006.01)
  *G03B 9/64* (2006.01)
  *G03B 21/14* (2006.01)
  *G02B 13/16* (2006.01)
  *G02B 13/18* (2006.01)
  *H04N 9/31* (2006.01)

(52) U.S. Cl.
  CPC ......... *G02B 13/0065* (2013.01); *G02B 13/04* (2013.01); *G02B 13/16* (2013.01); *G02B 13/18* (2013.01); *G03B 9/64* (2013.01); *G03B 21/142* (2013.01); *H04N 9/317* (2013.01); *H04N 9/3173* (2013.01)

(58) Field of Classification Search
  USPC ........................................ 353/74, 76, 77, 98
  See application file for complete search history.

(56) References Cited

U.S. PATENT DOCUMENTS

| | | | |
|---|---|---|---|
| 2008/0123059 | A1 | 5/2008 | Abe et al. |
| 2011/0026111 | A1* | 2/2011 | Nagatoshi ............... G02B 17/08 359/364 |
| 2011/0299049 | A1* | 12/2011 | Yatsu ..................... G02B 13/24 353/98 |
| 2012/0120484 | A1 | 5/2012 | Konuma et al. |
| 2014/0340658 | A1* | 11/2014 | Takano .................. G03B 21/28 353/99 |
| 2015/0029474 | A1* | 1/2015 | Tatsuno ................. G02B 17/08 353/97 |
| 2015/0205099 | A1* | 7/2015 | Arai .................... G02B 27/0025 353/98 |
| 2015/0370048 | A1* | 12/2015 | Takano ................ G02B 13/006 359/443 |
| 2016/0178878 | A1* | 6/2016 | Liu .................... G02B 13/0095 359/364 |
| 2016/0238822 | A1* | 8/2016 | Minefuji ................ G02B 17/08 |

FOREIGN PATENT DOCUMENTS

| | | |
|---|---|---|
| JP | 2008-96762 A | 4/2008 |
| JP | 2010-181672 A | 8/2010 |
| JP | 2011-253024 A | 12/2011 |
| JP | 2012-108267 A | 6/2012 |
| JP | 2013-029788 A | 2/2013 |

* cited by examiner

F I G. 3

| NAME | | SHAPE | RADIUS OF CURVATURE | INTERPLANAR DISTANCE | NAME OF GLASS MATERIAL | ECCENTRICITY/SLANT | |
|---|---|---|---|---|---|---|---|
| | | | | | | CONTENT | ECCENTRICITY | SLANT |
| OBJECT PLANE | 0th PLANE | FLAT PLANE | ∞ | 0.303 | | | | |
| FILTERS | 1st PLANE | SPHERICAL PLANE | ∞ | 0.65 | EAGLE XG Corning | | | |
| | 2nd PLANE | SPHERICAL PLANE | ∞ | 3 | | | | |
| FILTERS | 3rd PLANE | SPHERICAL PLANE | ∞ | 14 | BSC7 HOYA | | | |
| | 4th PLANE | SPHERICAL PLANE | ∞ | 2.000 | | | | |
| L1 | 5th PLANE | SPHERICAL PLANE | 18.876 | 5.920 | FDS90 HOYA | NORMAL ECCENTRICITY | 4.215 | -0.615 |
| | 6th PLANE | SPHERICAL PLANE | -102 | 2.454 | | | | |
| L2 | 7th PLANE | ASPHERICAL PLANE | 226.8206 | 3 | PMMA | | | |
| | 8th PLANE | ASPHERICAL PLANE | 212.1346 | 0.3 | | | | |
| L3 | 9th PLANE | SPHERICAL PLANE | 13.952 | 6.359 | FC5 HOYA | | | |
| L4 | 10th PLANE | SPHERICAL PLANE | -12.292 | 1 | FDS90 HOYA | | | |
| L5 | 11th PLANE | SPHERICAL PLANE | 8.159 | 3.67 | FC5 HOYA | | | |
| | 12th PLANE | SPHERICAL PLANE | -18.785 | 1.800 | | | | |
| APERTURE STOP | 13th PLANE | SPHERICAL PLANE | ∞ | 3.039 | | | | |
| L6 | 14th PLANE | SPHERICAL PLANE | 96.388 | 2.2 | EFD1 HOYA | | | |
| | 15th PLANE | SPHERICAL PLANE | -19.18 | 0.300 | | | | |
| L7 | 16th PLANE | ASPHERICAL PLANE | 28.3567 | 3 | PMMA | | | |
| | 17th PLANE | ASPHERICAL PLANE | 17.6728 | 5.014 | | | | |
| L8 | 18th PLANE | SPHERICAL PLANE | -19.465 | 1 | FC5 HOYA | | | |
| | 19th PLANE | SPHERICAL PLANE | 36.5 | 0.706 | | | | |
| L9 | 20th PLANE | SPHERICAL PLANE | 115 | 5.4 | EFD15 HOYA | | | |
| | 21st PLANE | SPHERICAL PLANE | -14.94 | 4.216 | | | | |
| L10 | 22nd PLANE | ODD-ORDER POLYGONAL ASPHERICAL PLANE | -14.1619 | 3 | PMMA | | | |
| | 23rd PLANE | ODD-ORDER POLYGONAL ASPHERICAL PLANE | -110.0357 | 12.846 * | | | | |
| L11 | 24th PLANE | XY POLYGONAL PLANE | ∞ | 5.7 | PMMA | DAR | 1.536 | 0 |
| | 25th PLANE | XY POLYGONAL PLANE | ∞ | 8.831 * | | DAR | 0.350 | 0 |
| L12 | 26th PLANE | XY POLYGONAL PLANE | ∞ | 6.1 | PMMA | DAR | 8.484 | 0 |
| | 27th PLANE | XY POLYGONAL PLANE | ∞ | 0 | | DAR | 8.484 | 0 |
| RETURN TO 23rd PLANE | 28th PLANE | DUMMY PLANE | ∞ | 58.797 | | | | |
| M13 | 29th PLANE | XY POLYGONAL PLANE | ∞ | 0 | REFLECTING GLASS | DAR | 39.763 | -23.865 |
| | 30th PLANE | DUMMY PLANE | ∞ | -434.005 * | | NORMAL ECCENTRICITY | 0.000 | -67.007 |
| IMAGE PLANE | 31st PLANE | FLAT PLANE | ∞ | 0 | | DAR | 0 | 66.573 |

| INTERPLANAR DISTANCE | 35 INCHES | 40 INCHES | 45 INCHES | 50 INCHES |
|---|---|---|---|---|
| 23rd PLANE | 12.261 | 12.846 | 13.261 | 13.615 |
| 25th PLANE | 9.026 | 8.831 | 8.640 | 8.502 |
| 30th PLANE | -380.6 | -434.0 | -487.3 | -540.5 |

FIG. 4

$$Z = \frac{c \cdot (x^2 + y^2)}{1 + \sqrt{1 - (1+K)c^2 \cdot (x^2 + y^2)}} + \sum \sum (C_j(m,n) \times x^m \times y^n)$$

$$j = [(m+n)^2 + m + 3n]/2 + 1$$

[MATHEMATICAL FORMULA 1]

| CODE | | L11A PLANE | L11B PLANE | L12A PLANE | L12B PLANE | M13 |
|---|---|---|---|---|---|---|
| 1/R | c | 0 | 0 | 0 | 0 | 0 |
| K | K | 0 | 0 | 0 | 0 | 0 |
| C3 | $Y^1$ | -1.69512E-01 | -6.18606E-02 | -1.41823E+00 | -7.61249E-01 | |
| C4 | $X^2$ | -3.86935E-02 | -4.99103E-02 | -8.47113E-02 | -4.47704E-02 | 4.92487E-03 |
| C6 | $Y^2$ | -4.03529E-02 | -5.28464E-02 | -5.07482E-02 | -4.55422E-02 | -9.42226E-04 |
| C8 | $X^2Y$ | -1.00451E-03 | -5.78265E-04 | 5.71827E-03 | 8.58820E-04 | -1.31985E-04 |
| C10 | $Y^3$ | -1.09957E-04 | 2.51207E-04 | 2.65770E-03 | 4.10603E-04 | -1.28789E-06 |
| C11 | $X^4$ | -1.77285E-04 | -1.41238E-04 | 1.48355E-04 | 1.41177E-05 | -6.43416E-07 |
| C13 | $X^2Y^2$ | -7.00000E-05 | -2.10522E-05 | -1.10586E-04 | 5.66539E-06 | 2.81909E-06 |
| C15 | $Y^4$ | -8.04787E-05 | -1.25003E-05 | 1.75320E-05 | 4.23759E-05 | 3.30568E-07 |
| C17 | $X^4Y$ | 1.67421E-05 | 1.34047E-05 | -1.95424E-05 | 5.91893E-07 | 3.95033E-08 |
| C19 | $X^2Y^3$ | 3.25043E-06 | 3.06217E-06 | 2.17470E-06 | 2.63498E-06 | -6.13253E-08 |
| C21 | $Y^5$ | 1.66914E-06 | -6.96227E-07 | 4.76267E-06 | -1.80650E-06 | -1.00347E-08 |
| C22 | $X^6$ | 1.05099E-06 | 7.39349E-07 | -1.29317E-07 | 7.10604E-08 | 1.38787E-10 |
| C24 | $X^4Y^2$ | -3.49140E-07 | -7.73849E-08 | 1.58588E-06 | 4.80985E-08 | -1.47142E-09 |
| C26 | $X^2Y^4$ | 1.59480E-07 | 1.79569E-07 | 2.43743E-07 | -4.98527E-07 | 8.23013E-10 |
| C28 | $Y^6$ | -2.84180E-07 | 7.27822E-08 | -8.27566E-08 | -2.00176E-07 | -3.66830E-10 |
| C30 | $X^6Y$ | -3.71444E-08 | -1.72890E-08 | 2.46627E-08 | -1.73841E-08 | -1.10409E-11 |
| C32 | $X^4Y^3$ | -2.77908E-08 | 5.12062E-09 | -8.31639E-08 | -3.73721E-08 | 5.01052E-11 |
| C34 | $X^2Y^5$ | -7.42838E-08 | 1.23296E-08 | -8.48066E-08 | 8.77381E-09 | 2.48383E-11 |
| C36 | $Y^7$ | -9.74494E-09 | 3.36712E-09 | -4.33459E-08 | 1.19282E-08 | -1.55123E-11 |
| C37 | $X^8$ | -5.72842E-09 | -1.43250E-09 | 9.15413E-11 | -1.25677E-10 | -3.98087E-14 |
| C39 | $X^6Y^2$ | -1.10702E-08 | -2.35556E-10 | -4.58008E-09 | 3.46361E-10 | 5.39444E-13 |
| C41 | $X^4Y^4$ | -2.74898E-09 | 9.78170E-10 | 3.31156E-09 | 2.37490E-09 | -1.73556E-12 |
| C43 | $X^2Y^6$ | 9.71682E-10 | 3.53737E-10 | 1.53180E-09 | 1.01327E-09 | 1.25905E-12 |
| C45 | $Y^8$ | 8.12760E-10 | 1.26618E-10 | 6.04607E-10 | 2.92308E-10 | 4.83424E-14 |
| C47 | $X^8Y$ | 3.27470E-11 | -4.57379E-11 | 2.69203E-11 | 3.12224E-11 | 2.02220E-15 |
| C49 | $X^6Y^3$ | 1.52493E-10 | -2.60259E-11 | 1.35851E-10 | 3.37708E-11 | -1.29674E-14 |
| C51 | $X^4Y^5$ | -1.74771E-10 | -1.27887E-11 | 2.97127E-10 | -2.34320E-11 | -2.34748E-14 |
| C53 | $X^2Y^7$ | 2.13758E-10 | -7.60400E-12 | 1.44928E-10 | -1.32967E-10 | 1.68898E-14 |
| C55 | $Y^9$ | 2.53852E-11 | -2.86453E-13 | 1.17160E-10 | -2.11209E-11 | 3.86861E-15 |
| C56 | $X^{10}$ | 9.54653E-12 | 1.29998E-12 | -7.12862E-13 | -1.02074E-13 | 8.66609E-18 |
| C58 | $X^8Y^2$ | 3.84515E-11 | 5.50224E-12 | 3.81359E-12 | -8.00482E-13 | -1.50770E-16 |
| C60 | $X^6Y^4$ | 2.41327E-11 | -4.61625E-12 | -2.72293E-12 | -2.37488E-12 | 9.35100E-16 |
| C62 | $X^4Y^6$ | 1.14044E-11 | -2.86546E-12 | -1.75358E-11 | -7.57852E-13 | -5.77749E-16 |
| C64 | $X^2Y^8$ | -2.35735E-11 | -2.42798E-12 | 4.15652E-12 | 3.81855E-12 | -1.90295E-16 |
| C66 | $Y^{10}$ | -5.45205E-12 | -4.04549E-13 | -5.49528E-12 | -9.43493E-13 | 3.07353E-17 |

FIG. 5

$$Z = \frac{c \cdot h^2}{1+\sqrt{1-(1+K)c^2 \cdot h^2}} + A \times h^4 + B \times h^6 + C \times h^8 + D \times h^{10}$$

$$+ E \times h^{12} + F \times h^{14} + G \times h^{16} + H \times h^{18} + J \times h^{20}$$

[MATHEMATICAL FORMULA 2]

|     | L2A PLANE     | L2B PLANE     | L7A PLANE     | L7B PLANE     |
|-----|---------------|---------------|---------------|---------------|
| 1/c | 226.8206      | 212.1346      | 28.3567       | 17.6728       |
| K   | 0             | 0             | 0             | 0             |
| A   | -1.01422E-04  | -8.40636E-06  | -5.14006E-05  | -1.46558E-04  |
| B   | -4.43439E-07  | -8.63643E-07  | 4.27451E-06   | 4.40512E-06   |
| C   | 2.06693E-09   | 1.40764E-09   | -6.74935E-09  | 4.06087E-09   |
| D   | -9.93063E-13  | -2.42245E-11  | -3.98508E-10  | -2.27554E-10  |
| E   | 5.12260E-14   | -1.65620E-13  | 8.68615E-13   | 1.79141E-12   |
| F   | -2.22566E-16  | 2.70698E-16   | 1.02325E-13   | 7.94434E-14   |
| G   | -3.37600E-18  | 2.66218E-17   | 8.92534E-16   | 4.01173E-16   |
| H   | 5.67012E-22   | 2.92561E-19   | -2.36022E-17  | -1.11014E-17  |
| J   | 9.44392E-23   | -3.31018E-21  | -5.28706E-20  | 9.53448E-20   |

FIG. 6

|            | L10A PLANE    | L10B PLANE    |
|------------|---------------|---------------|
| 1/c        | -14.1619      | -110.036      |
| K          | 0             | 0             |
| 3rd ORDER  | 0.000168372   | 0.000267275   |
| 4th ORDER  | -1.76395E-04  | -8.84282E-05  |
| 6th ORDER  | 1.55533E-08   | 4.39076E-08   |
| 8th ORDER  | -4.66699E-09  | 5.33335E-10   |
| 10th ORDER | 1.96613E-11   | 2.32731E-14   |
| 12th ORDER | 2.74250E-13   | -4.01516E-15  |
| 14th ORDER | 1.18590E-15   | -6.88733E-18  |
| 16th ORDER | 6.92994E-19   | 4.41411E-20   |
| 18th ORDER | -1.12856E-20  | 2.88985E-22   |
| 20th ORDER | 5.01591E-22   | -5.47404E-25  |

F I G. 7
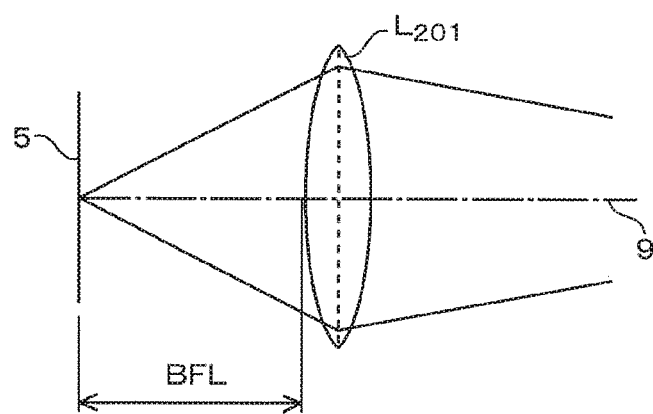
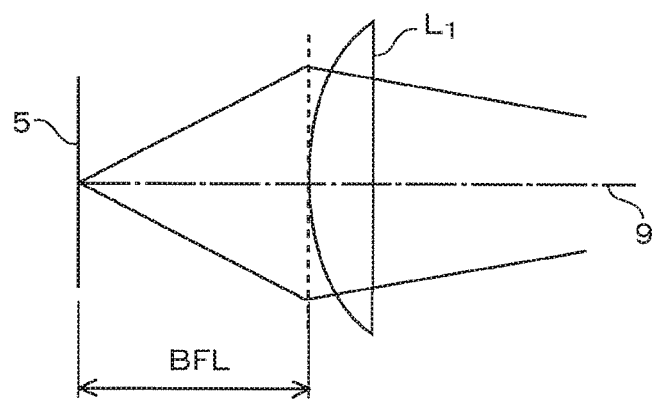

FIG. 9

| | | AXIAL RAY EQUIVALENT HEIGHT | CHIEF RAY EQUIVALENT HEIGH |
|---|---|---|---|
| | | $M_2-M_1$ | $P_1-M_1$ |
| L1 | INCIDENT PLANE | 6.44 | −6.07 |
| | EMITTING PLANE | 6.79 | −5.44 |
| L2 | INCIDENT PLANE | 6.92 | −4.43 |
| | EMITTING PLANE | 7.05 | −3.76 |
| L3 | INCIDENT PLANE | 7.08 | −3.42 |
| L4 | CEMENTED PLANE | 6.43 | −1.71 |
| L5 | CEMENTED PLANE | 6.44 | −1.42 |
| | EMITTING PLANE | 7.06 | −0.67 |
| APERTURE STOP | | 7.39 | −0.01 |
| L6 | INCIDENT PLANE | 7.88 | 1.11 |
| | EMITTING PLANE | 7.97 | 1.51 |
| L7 | INCIDENT PLANE | 7.77 | 1.65 |
| | EMITTING PLANE | 7.02 | 2.15 |
| L8 | INCIDENT PLANE | 6.23 | 3.48 |
| | EMITTING PLANE | 6.24 | 4.04 |
| L9 | INCIDENT PLANE | 6.27 | 4.28 |
| | EMITTING PLANE | 6.34 | 5.18 |
| L10 | INCIDENT PLANE | 5.13 | 5.73 |
| | EMITTING PLANE | 5.00 | 7.40 |

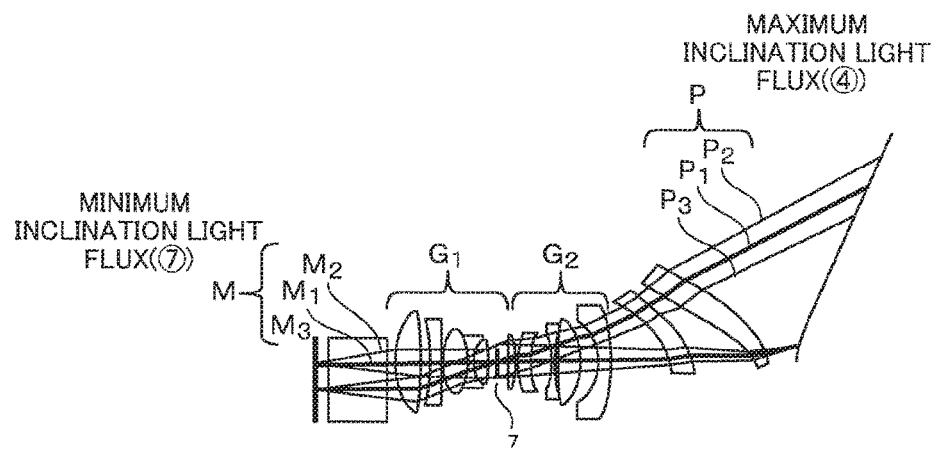

F I G. 10

|     | FOCAL LENGTH OF FIRST EMBODIMENT |
|-----|-----|
| L1  | 19.1 |
| L2  | -7137.9 |
| L3  | 14.5 |
| L4  | -5.6 |
| L5  | 12.2 |
| L6  | 22.3 |
| L7  | -105.0 |
| L8  | -25.8 |
| L9  | 19.1 |
| L10 | -33.3 |

| L3-L5 | -235.6 |
|-------|--------|

| L1-L6  | 21.2 |
|--------|------|
| L7-L10 | -50.0 |

F I G. 1 2
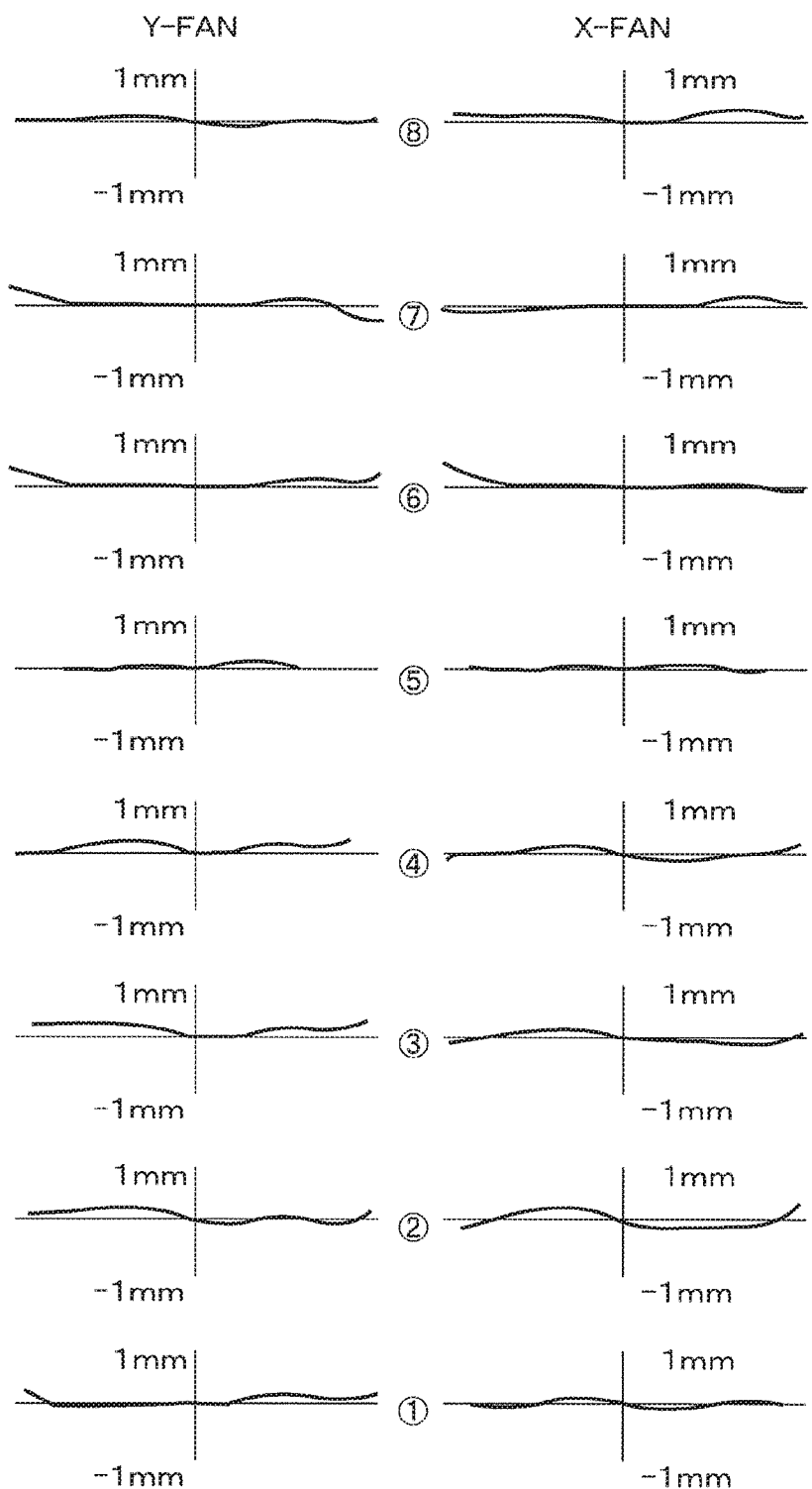

F I G. 1 3
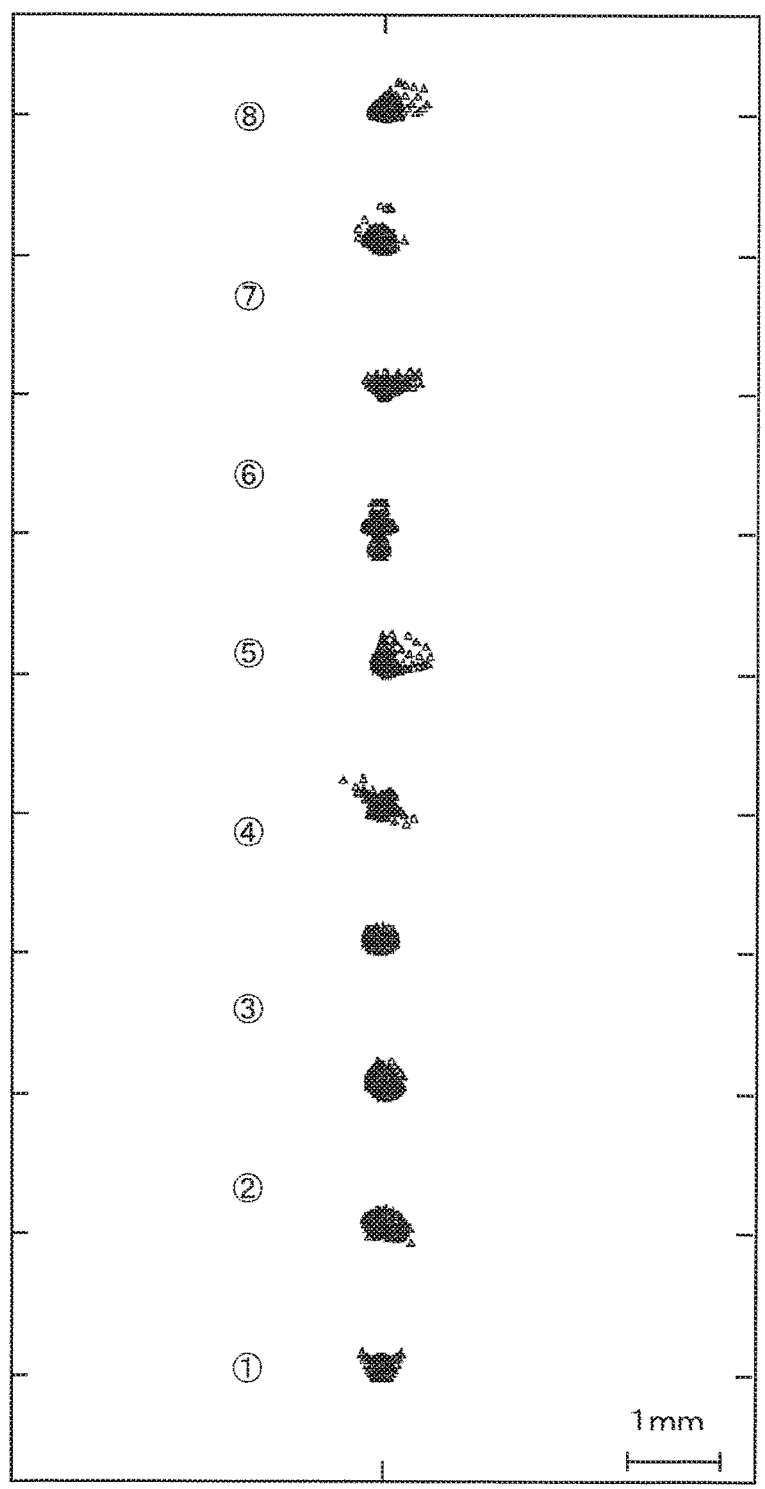

F I G. 1 5
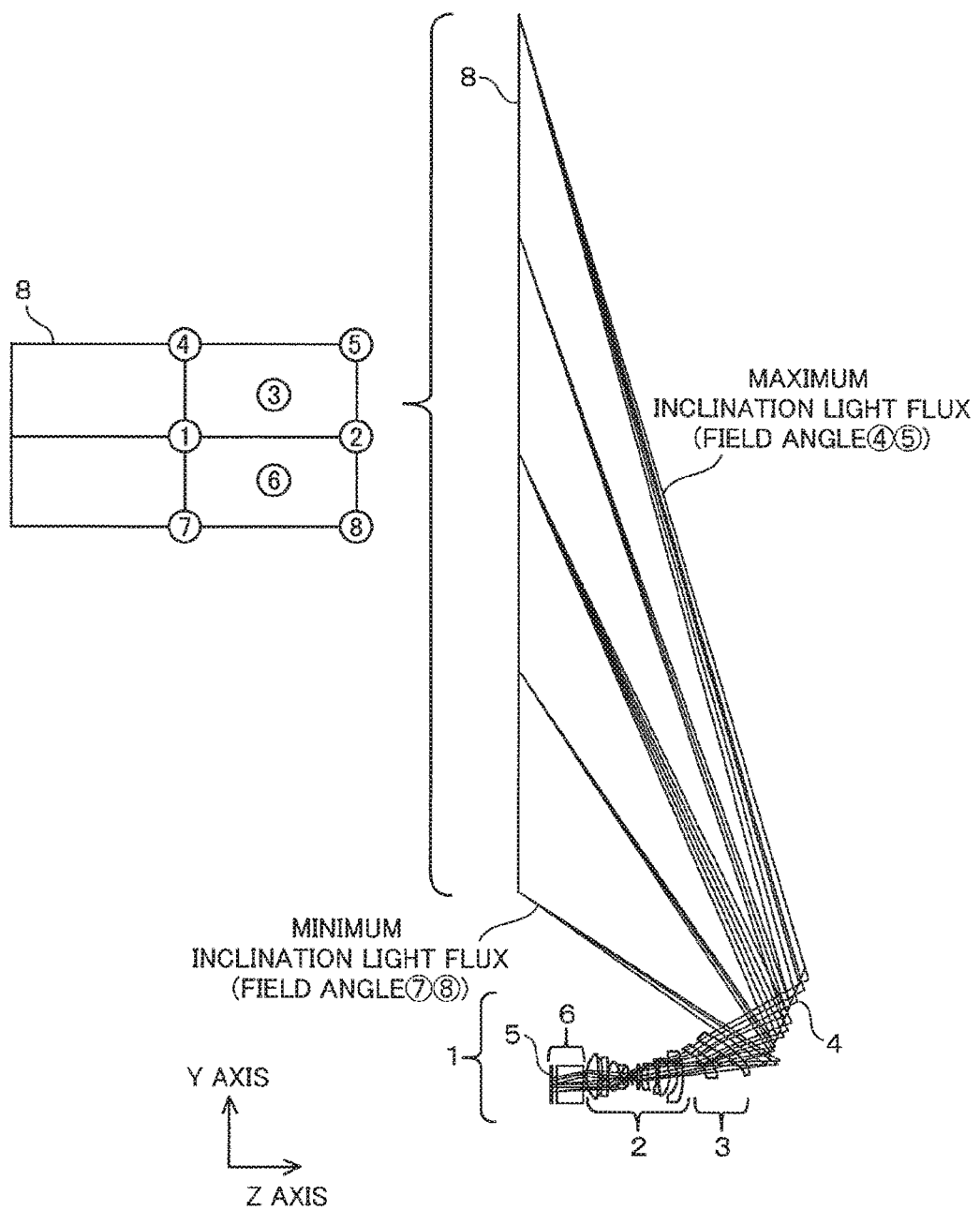

F I G. 16

| NAME | | SHAPE | RADIUS OF CURVATURE | INTERPLANAR DISTANCE | NAME OF GLASS MATERIAL | ECCENTRICITY/SLANT | | |
|---|---|---|---|---|---|---|---|---|
| | | | | | | CONTENT | ECCENTRICITY | SLANT |
| OBJECT PLANE | 0th PLANE | FLAT PLANE | ∞ | 0.303 | | | | |
| FILTERS | 1st PLANE | SPHERICAL PLANE | ∞ | 0.65 | EAGLE_XG_Corning | | | |
| | 2nd PLANE | SPHERICAL PLANE | ∞ | 3 | | | | |
| FILTERS | 3rd PLANE | SPHERICAL PLANE | ∞ | 14 | BSC7_HOYA | | | |
| | 4th PLANE | SPHERICAL PLANE | ∞ | 1.400 | | | | |
| L1 | 5th PLANE | SPHERICAL PLANE | 18.104 | 6.080 | FDS90_HOYA | NORMAL ECCENTRICITY | 3.960 | -1.325 |
| | 6th PLANE | SPHERICAL PLANE | -103.668 | 2.239 | | | | |
| L2 | 7th PLANE | ASPHERICAL PLANE | 273.9890 | 2.5 | ZEONEX_K26R | | | |
| | 8th PLANE | ASPHERICAL PLANE | 284.4339 | 0.3 | | | | |
| L3 | 9th PLANE | SPHERICAL PLANE | 14.84 | 6.350 | FC5_HOYA | | | |
| L4 | 10th PLANE | SPHERICAL PLANE | -11.8596 | 0.8 | FDS90_HOYA | | | |
| L5 | 11th PLANE | SPHERICAL PLANE | 8.009 | 3.95 | FC5_HOYA | | | |
| | 12th PLANE | SPHERICAL PLANE | -17.198 | 1.800 | | | | |
| APERTURE STOP | 13th PLANE | SPHERICAL PLANE | ∞ | 2.348 | | | | |
| L6 | 14th PLANE | SPHERICAL PLANE | 99.283 | 2.25 | EFD1_HOYA | | | |
| | 15th PLANE | SPHERICAL PLANE | -16.446 | 0.576 | | | | |
| L7 | 16th PLANE | ASPHERICAL PLANE | 31.8118 | 3.1 | ZEONEX_K26R | | | |
| | 17th PLANE | ASPHERICAL PLANE | 18.9053 | 4.893 | | | | |
| L8 | 18th PLANE | SPHERICAL PLANE | -19.317 | 0.8 | FC5_HOYA | | | |
| | 19th PLANE | SPHERICAL PLANE | 35.705 | 0.868 | | | | |
| L9 | 20th PLANE | SPHERICAL PLANE | 134.901 | 5.25 | EFD15_HOYA | | | |
| | 21st PLANE | SPHERICAL PLANE | -15.004 | 4.877 | | | | |
| L10 | 22nd PLANE | ODD-ORDER POLYGONAL ASPHERICAL PLANE | -15.3268 | 3.7 | ZEONEX_K26R | | | |
| | 23rd PLANE | ODD-ORDER POLYGONAL ASPHERICAL PLANE | -89.2275 | 13.590 * | | | | |
| L11 | 24th PLANE | XY POLYGONAL PLANE | ∞ | 5.65 | PMMA | DAR | 0.792 | 0 |
| | 25th PLANE | XY POLYGONAL PLANE | ∞ | 8.393 * | | DAR | 0.946 | 0 |
| L12 | 26th PLANE | XY POLYGONAL PLANE | ∞ | 6.2 | PMMA | DAR | 8.334 | 0 |
| | 27th PLANE | XY POLYGONAL PLANE | ∞ | 0 | | DAR | 8.334 | 0 |
| RETURN TO 23rd PLANE | 28th PLANE | DUMMY PLANE | ∞ | 58.466 | | | | |
| M13 | 29th PLANE | XY POLYGONAL PLANE | ∞ | 0 | REFLECTING GLASS | DAR | 38.777 | -23.917 |
| | 30th PLANE | DUMMY PLANE | ∞ | -436.629 * | | NORMAL ECCENTRICITY | 0.000 | -66.713 |
| IMAGE PLANE | 31st PLANE | FLAT PLANE | ∞ | 0 | | DAR | 0 | 66.709 |

| INTERPLANAR DISTANCE | | 35 INCHES | 40 INCHES | 45 INCHES | 50 INCHES |
|---|---|---|---|---|---|
| | 23rd PLANE | 13.011 | 13.591 | 14.007 | 14.357 |
| | 25th PLANE | 8.560 | 8.393 | 8.239 | 8.121 |
| | 30th PLANE | -381.9 | -436.6 | -491.2 | -545.6 |

FIG. 17

| CODE | | L11A PLANE | L11B PLANE | L12A PLANE | L12B PLANE | M13 |
|---|---|---|---|---|---|---|
| 1/R | c | 0 | 0 | 0 | 0 | 0 |
| K | K | 0 | 0 | 0 | 0 | 0 |
| C3 | $Y^1$ | -1.82782E-01 | -1.67402E-01 | -1.55814E+00 | -8.59767E-01 | 0 |
| C4 | $X^2$ | -3.68000E-02 | -5.04554E-02 | -8.37075E-02 | -4.26281E-02 | 5.09289E-03 |
| C6 | $Y^2$ | -3.54354E-02 | -5.00129E-02 | -6.14018E-02 | -4.93386E-02 | -8.51690E-04 |
| C8 | $X^2Y$ | -4.79338E-04 | -2.25918E-04 | 5.57314E-03 | 8.34492E-04 | -1.37071E-04 |
| C10 | $Y^3$ | -4.07209E-05 | 2.05730E-04 | 2.63140E-03 | 5.15861E-04 | -4.43550E-06 |
| C11 | $X^4$ | -1.67388E-04 | -1.28974E-04 | 1.48106E-04 | 1.16645E-05 | -6.50370E-07 |
| C13 | $X^2Y^2$ | -7.35592E-05 | -3.19358E-05 | -8.35117E-05 | 1.91798E-05 | 2.97446E-06 |
| C15 | $Y^4$ | -5.85191E-05 | -1.52171E-05 | 8.74014E-06 | 3.43376E-05 | 2.64296E-07 |
| C17 | $X^4Y$ | 1.86470E-05 | 1.43082E-05 | -1.82566E-05 | 8.06215E-07 | 3.98673E-08 |
| C19 | $X^2Y^3$ | 1.79706E-06 | 2.86533E-06 | 2.14392E-06 | 2.19397E-06 | -5.86788E-08 |
| C21 | $Y^5$ | 3.73966E-06 | -8.00257E-07 | 5.45216E-06 | -5.34465E-07 | -3.62488E-09 |
| C22 | $X^6$ | 1.13524E-06 | 7.66430E-07 | -1.74505E-07 | 5.74490E-08 | 1.43915E-10 |
| C24 | $X^4Y^2$ | -4.24316E-07 | -1.50173E-07 | 1.51375E-06 | 8.44721E-08 | -1.58818E-09 |
| C26 | $X^2Y^4$ | 6.24235E-07 | 1.67322E-07 | 4.14147E-07 | -4.44766E-07 | 6.18806E-10 |
| C28 | $Y^6$ | -2.41608E-07 | 7.16126E-08 | -9.08894E-08 | -2.62484E-07 | 6.14742E-11 |
| C30 | $X^6Y$ | -3.98524E-08 | -1.77121E-08 | 3.08874E-08 | -1.34099E-08 | -1.08608E-11 |
| C32 | $X^4Y^3$ | -1.17640E-08 | 2.10750E-09 | -7.54368E-08 | -4.00168E-08 | 5.28601E-11 |
| C34 | $X^2Y^5$ | -8.24376E-08 | 1.19201E-08 | -8.58784E-08 | 3.34653E-09 | 4.57199E-14 |
| C36 | $Y^7$ | -1.15662E-08 | 3.41514E-09 | -2.95254E-08 | 7.33578E-08 | -1.61583E-11 |
| C37 | $X^8$ | -5.32908E-08 | -1.48464E-09 | -4.55210E-11 | -1.50095E-10 | -4.18647E-14 |
| C39 | $X^6Y^2$ | -7.99677E-09 | -9.11064E-10 | -4.42486E-09 | -1.95417E-11 | 5.02841E-13 |
| C41 | $X^4Y^4$ | -3.52929E-09 | 9.80892E-10 | 3.95943E-09 | 1.79698E-09 | -1.08118E-12 |
| C43 | $X^2Y^6$ | -3.17457E-10 | 3.35626E-10 | 1.66652E-09 | 6.12083E-10 | 5.94826E-13 |
| C45 | $Y^8$ | -7.40198E-10 | 1.28560E-10 | 8.57029E-10 | 1.69030E-10 | -6.93425E-14 |
| C47 | $X^8Y$ | 1.39656E-11 | -6.16564E-11 | -2.08391E-12 | 1.88573E-11 | 2.26087E-15 |
| C49 | $X^6Y^3$ | -9.19701E-11 | -3.92209E-11 | 1.03609E-10 | 3.76475E-11 | -1.67038E-14 |
| C51 | $X^4Y^5$ | -1.39829E-10 | -4.77410E-12 | 2.87910E-10 | -1.29942E-11 | -7.01410E-15 |
| C53 | $X^2Y^7$ | 2.10769E-10 | -7.60620E-12 | 1.19659E-10 | -1.33100E-10 | 1.44955E-14 |
| C55 | $Y^9$ | 2.83040E-11 | -2.53304E-13 | 1.01755E-10 | -1.99094E-11 | 7.76337E-15 |
| C56 | $X^{10}$ | 1.18802E-11 | 2.40471E-12 | 1.61671E-13 | 2.29895E-14 | 7.71090E-18 |
| C58 | $X^8Y^2$ | 2.93241E-11 | 7.57744E-12 | 5.64091E-12 | -9.38801E-14 | -1.08858E-16 |
| C60 | $X^6Y^4$ | 2.35762E-11 | -4.04650E-12 | -1.10098E-11 | -1.75703E-12 | 6.27769E-16 |
| C62 | $X^4Y^6$ | 1.11680E-11 | -1.65475E-12 | -1.41070E-11 | 1.55494E-13 | -4.01237E-16 |
| C64 | $X^2Y^8$ | -1.84242E-11 | -2.29738E-12 | -1.11521E-12 | 3.44820E-12 | -2.01008E-16 |
| C66 | $Y^{10}$ | -4.61350E-12 | -3.88777E-13 | -6.36206E-12 | -7.51847E-13 | 1.15728E-16 |

F I G. 18

|  | L2A PLANE | L2B PLANE | L7A PLANE | L7B PLANE |
|---|---|---|---|---|
| 1/c | 273.9830 | 284.4339 | 31.8118 | 18.9053 |
| K | 0 | 0 | 0 | 0 |
| A | -1.05038E-04 | -7.19219E-06 | -3.07173E-05 | -1.30712E-04 |
| B | -4.90263E-07 | -8.56903E-07 | 4.47105E-06 | 4.82218E-06 |
| C | 2.31589E-09 | 1.71425E-09 | -1.18702E-08 | -3.65693E-11 |
| D | 3.93356E-12 | -2.79744E-11 | -4.16157E-10 | -2.72022E-10 |
| E | 5.72363E-14 | -1.83437E-13 | 3.65975E-12 | 3.69297E-12 |
| F | -5.84968E-16 | 4.62242E-16 | 1.12272E-13 | 1.11606E-13 |
| G | -7.15393E-18 | 2.60940E-17 | 2.00627E-17 | -2.54222E-16 |
| H | -3.01327E-21 | 2.32328E-19 | -6.06398E-17 | -2.75953E-17 |
| J | 4.46322E-22 | -2.56572E-21 | 6.09851E-19 | 2.17434E-19 |

F I G. 19

|  | L10A PLANE | L10B PLANE |
|---|---|---|
| 1/c | -15.3268 | -89.227 |
| K | 0 | 0 |
| 3rd ORDER | 0.000149597 | 0.000194814 |
| 4th ORDER | -1.96844E-04 | -9.00205E-05 |
| 6th ORDER | 1.34722E-08 | 5.00941E-08 |
| 8th ORDER | -4.58303E-09 | 5.63063E-10 |
| 10th ORDER | 2.12914E-11 | -1.95478E-14 |
| 12th ORDER | 2.76128E-13 | -4.54609E-15 |
| 14th ORDER | 1.03164E-15 | -9.53539E-18 |
| 16th ORDER | -1.97251E-18 | 3.14713E-20 |
| 18th ORDER | -3.17190E-20 | 2.65820E-22 |
| 20th ORDER | 3.45958E-22 | -4.92720E-25 |

FIG. 20

|  | FOCAL LENGTH OF SECOND EMBODIMENT |
|---|---|
| L1 | 18.5 |
| L2 | 12826.7 |
| L3 | 14.6 |
| L4 | -5.5 |
| L5 | 11.8 |
| L6 | 21.7 |
| L7 | -94.8 |
| L8 | -25.5 |
| L9 | 19.5 |
| L10 | -35.1 |

| L3-L5 | -173.5 |
|---|---|

| L1-L6 | 20.4 |
|---|---|
| L7-L10 | -47.8 |

F I G. 2 1
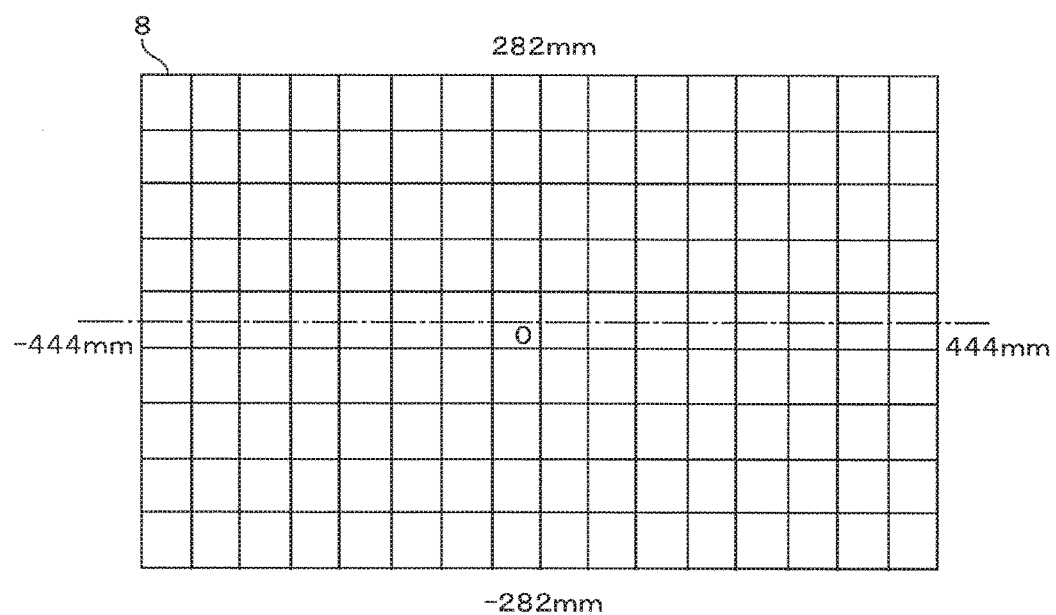

F I G. 2 4
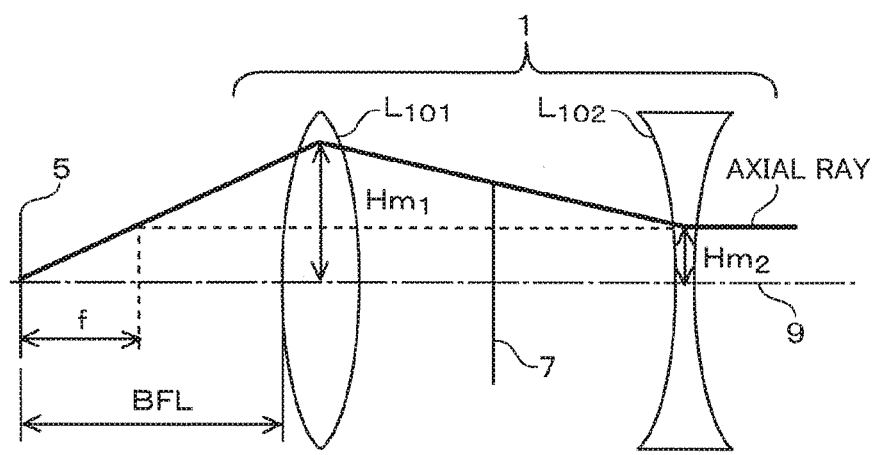
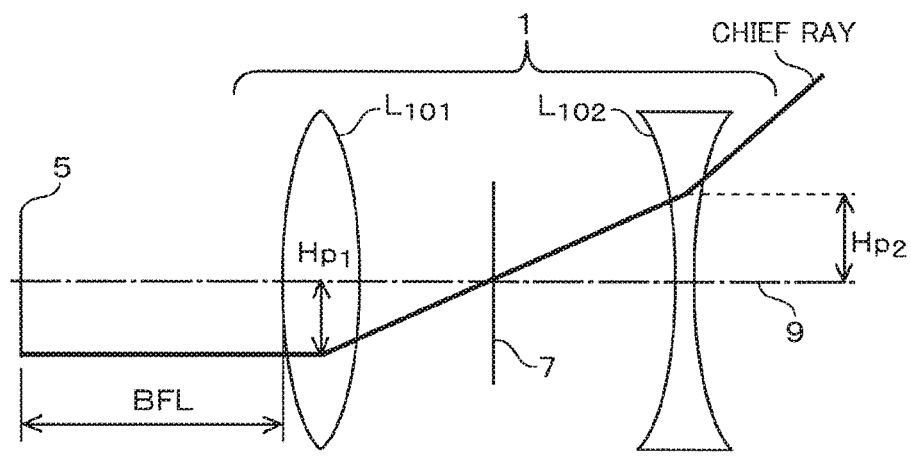

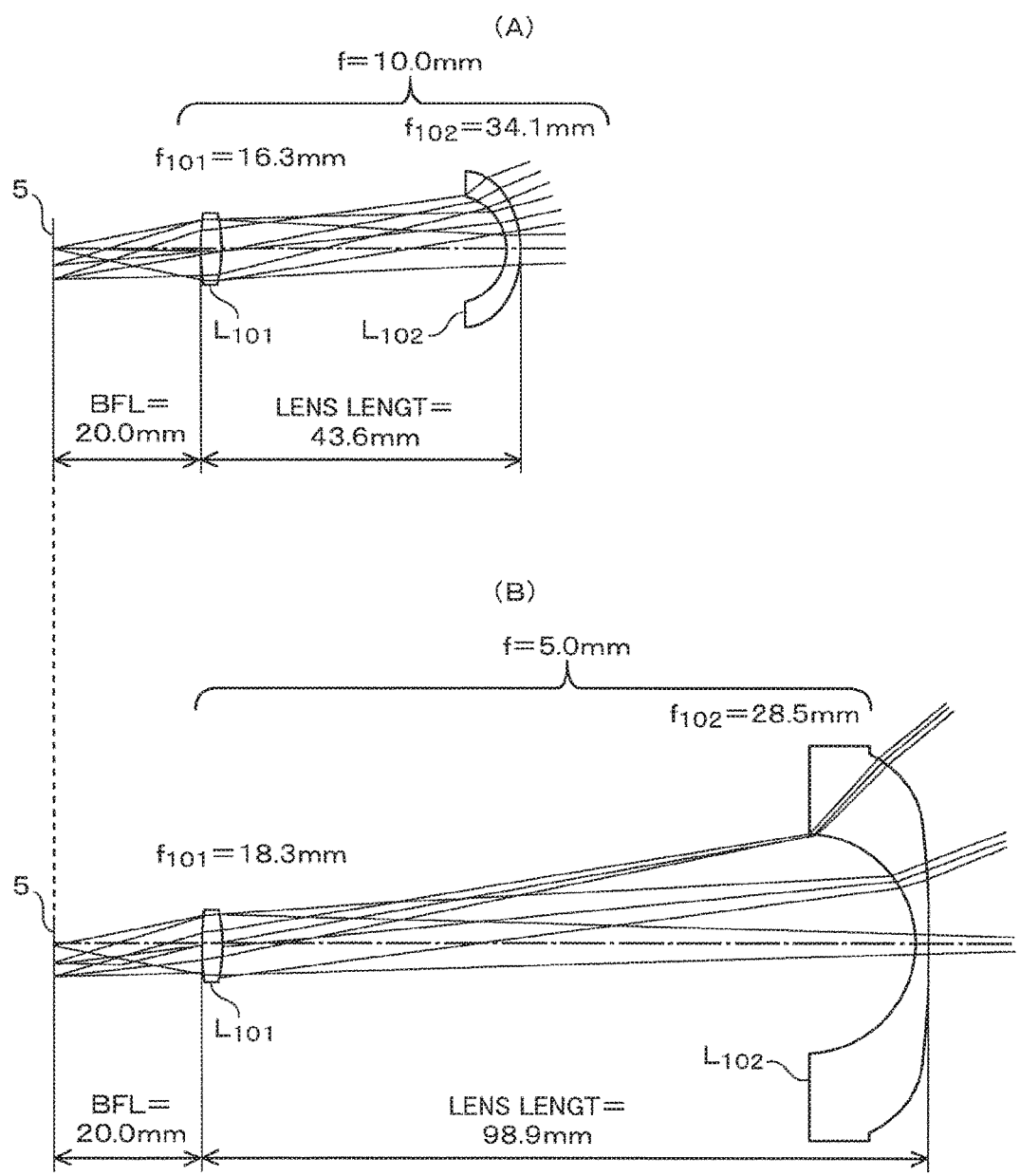
F I G. 2 5

PROJECTION-TYPE VIDEO DISPLAY DEVICE

CROSS-REFERENCE TO RELATED APPLICATIONS

This Application is the U.S. National Phase of PCT/JP2013/061967filed Apr. 24, 2013, the subject matter of which is incorporated herein by reference in entirety.

TECHNICAL FIELD

The present invention relates to a projection-type video display device.

BACKGROUND ART

In the related art, there is known a projection optical system using two free-form-surface lenses and a free-form-surface mirror as free-form-surface optical elements (refer to Patent Document 1).

CITATION LIST

Patent Document

Patent Document 1: JP 2011-253024 A

SUMMARY OF THE INVENTION

Problems to be Solved by the Invention

In Patent Document 1, in order to arrange a color-combining prism (thickness of filters: 25.642 mm), a large back focus (hereinafter, referred to as a BFL) is secured, and the lens length (distance from the incident plane of the lens 1 to the emitting plane of the lens 14) of the coaxial system lens group is set to 91.1 mm, the distance from the video display element to the free-form-surface mirror is set to 200.6 mm, and the distance from the free-form-surface mirror to the image plane is set to 500 mm, so that the projection image of 80 inches (long side: 1707 mm) is implemented (projection ratio=500/1707=0.3). However, the reduction of the projection distance and the miniaturization of the projection optical system are further required.

The present invention is to provide a projection-type video display device implementing further reduction of a projection distance (wide angle implementation) and further miniaturization of a projection optical system.

Solutions to Problems

The above-described problem is solved by the invention disclosed in Claims.

Effects of the Invention

According to the present invention, it is possible to provide a projection-type video display device implementing further reduction of a projection distance (wide angle implementation) and further miniaturization of a projection optical system.

BRIEF DESCRIPTION OF THE DRAWINGS

FIG. 3 is a diagram illustrating lens data according to the first embodiment.

FIG. 4 is a diagram illustrating free-form-surface coefficients according to the first embodiment.

FIG. 5 is a diagram illustrating aspherical coefficients according to the first embodiment.

FIG. 6 is a diagram illustrating odd-order polygonal aspherical coefficients according to the first embodiment.

FIG. 7 is an explanatory diagram of a shape of a lens 1.

FIG. 9 is an explanatory diagram of minimum inclination light flux and maximum inclination light flux.

FIG. 10 is a diagram illustrating focal lengths of lens balls according to the first embodiment.

FIG. 12 is a diagram illustrating lateral aberration according to the first embodiment.

FIG. 13 is a spot diagram according to the first embodiment.

FIG. 15 is a diagram illustrating light rays of the projection optical system according to the second embodiment.

FIG. 16 is a diagram illustrating lens data according to the second embodiment.

FIG. 17 is a diagram illustrating free-form-surface coefficients according to the second embodiment.

FIG. 18 is a diagram illustrating aspherical coefficients according to the second embodiment.

FIG. 19 is a diagram illustrating odd-order polygonal aspherical coefficients according to the second embodiment.

FIG. 20 is a diagram illustrating focal lengths of lens balls according to the second embodiment.

FIG. 21 is a diagram illustrating distortion aberration according to the second embodiment.

FIG. 24 is an explanatory diagram of BFL secured by retrofocusing.

FIG. 25 is a diagram illustrating light rays of an optical design of wide angle implementation.

MODE FOR CARRYING OUT THE INVENTION

Figure 1:
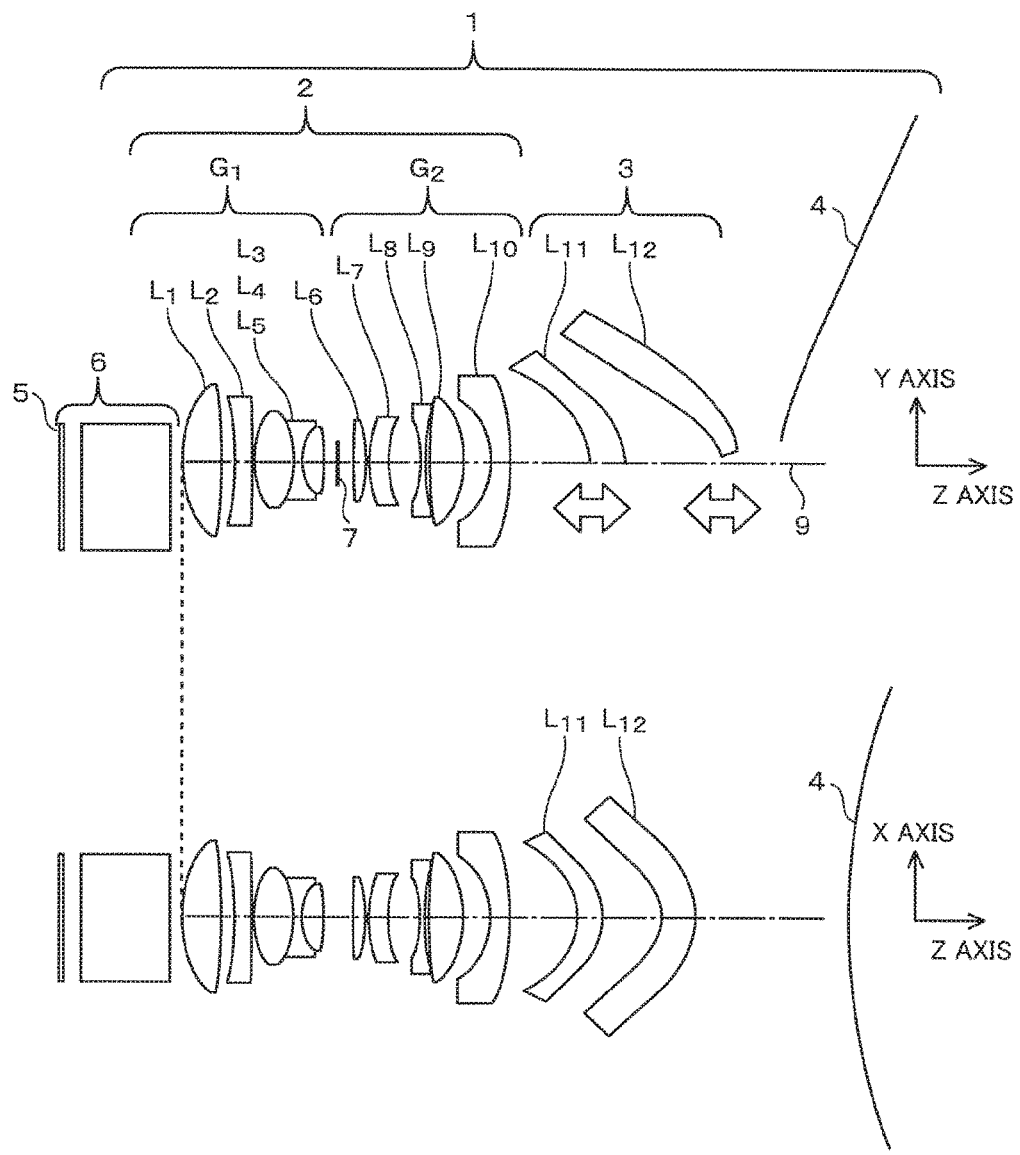
FIG. 1 is a diagram illustrating a configuration of a projection optical system according to a first embodiment.

First, for the better understanding of the present invention, the problems of the present invention will be described. FIG. 24 is diagram for explaining a BFL secured by retrofocusing. A projection optical system of FIG. 24 is configured to include, from a video display element 5 side, a lens $L_{101}$ having positive refractive power and a lens $L_{102}$ having negative refractive power. If a light ray is incident from the lens $L_{102}$ side, the light ray is flipped up by the negative refractive power of the lens $L_{102}$, and the light ray is bent by the positive refractive power of the lens $L_{101}$. As the light ray is flipped-up by the lens $L_{102}$, the BFL which is about two times a focal length f is secured.

Herein, in order to summarize the problems of the wide angle implementation, an optical design of the wide angle implementation was performed in a retrofocus type of FIG. 24. FIG. 25 is a diagram illustrating light rays of the optical design with BFL=20.0 mm in the same configuration as that of FIG. 24. A field angle is set to a half field angle of 30°, and the lens $L_{101}$ and the lens $L_{102}$ are configured to have an aspherical shape.

In FIG. 25(A), the focal length $f_{101}$ of the lens $L_{101}$ is set to 16.3 mm, the focal length $f_{102}$ of the lens $L_{102}$ is set to −34.1 mm, and the lens length is set to 43.6 mm, so that the projection optical system having a focal length f of 10.0 mm is implemented (BFL=2f). In FIG. 25(B), the focal length $f_{101}$ of the lens $L_{101}$ is set to 18.3 mm, the focal length $f_{102}$ of the lens $L_{102}$ is set to −28.5 mm, and the lens length is set to 98.9 mm, so that the projection optical system having a focal length f of 5.0 mm is implemented (BFL=4f).

In this manner, if only the wide angle implementation is required, the wide angle implementation can be achieved by increasing the size of the projection optical system. However, in a case where the wide angle implementation of the projection optical system (projection image of 80 inches in a projection distance of 500 mm) disclosed in Patent Document 1 is performed, the projection distance is further shortened, but the possibility of interference between the projection image and the projection-type video display device is increased. For example, as a use form of the projection-type video display device, in a case where a projection image of 40 inches is required to be displayed, the projection distance becomes about 250 mm (=500×40/80), and thus, the interference between the projection image and the projection-type video display device occurs. Therefore, further wide angle implementation cannot be performed.

In addition, the flipping-up of the light ray for implementing the wide angle implementation of the projection optical system leads to an increase in the interval between the lens $L_{101}$ and the lens $L_{102}$ (increase in size) and an increase in the refractive powers of the lens $L_{101}$ and the lens $L_{102}$. However, if the refractive powers of the lens $L_{101}$ and the lens $L_{102}$ are allowed to be increased, the aberration is increased, so that optical performance is deteriorated. Therefore, in general, the lens ball is allowed to be divided (the number of lenses is increased). However, if so, although the distance on the optical axis between the convex lens balls, the edge thickness of the convex lens ball, the center thickness of the concave lens ball, the interference of the edge portion of the concave lens ball are restricted, the lens length is increased. Furthermore, due to the increase in the number of lenses, the production cost is increased.

First Embodiment

Next, a first embodiment will be described. FIG. 1. is a diagram illustrating a configuration of a projection optical system 1. In the projection optical system 1, a video display element 5, a reduction filter 6, a coaxial system lens group 2 having a refraction function and including a plurality of lenses, a free-form-surface lens group 3, and a free-form-surface mirror 4 are disposed in this order in the light propagation direction. The reduction filter 6 is expressed to include a dust-proof glass of the video display element 5, a polarizing plate, a color-combining prism, and the like.

Herein, the refractive power of the free-form-surface lens is defined as follow. In a case where the passing distance of the chief ray far from the optical axis is smaller than the passing distance of the chief ray close to the optical axis of the lens group 2 passing through the free-form-surface lens, the refractive power is defined to be positive. On the contrary, in a case where the passing distance of the chief ray far from the optical axis is larger than the passing distance of the chief ray close to the optical axis of the lens group 2 passing through the free-form-surface lens, the refractive power is defined to be negative. In addition, in a case where the ray is coincident with the optical axis of the lens, the passing distance is equal to the center thickness of the lens.

The video light emitted from the video display element 5 passes through the reduction filter 6 and is subject to the refraction function in the coaxial system lens group 2 and the free-form-surface lens group 3. Next, the video light is reflected on the free-form-surface mirror 4 to be projected on an image plane 8 (screen).

The lens group 2 is a retrofocus type configured to include a first lens group $G_1$ having positive refractive power and a second lens group $G_2$ having negative refractive power. In addition, an aperture stop 7 is disposed between the first lens group $G_1$ and the second lens group $G_2$.

Hereinafter, in the description of lenses, the video display element side is referred to as a reduction side, and the light propagation direction (image plane side) is referred to as a magnification side.

The first lens group $G_1$ is configured to include a lens $L_1$ which is made of a glass, has positive refractive power, and has a small radius of curvature oriented toward the reduction side, an aspherical lens $L_2$ which is made of a plastic and has a refractive index of 1.8 or more, a bi-convex lens $L_3$ which is made of a glass, has an Abbe number of 70 or more, and has positive refractive power, a bi-concave lens $L_4$ which is made of a glass, has an Abbe number of 25 or less, and has negative refractive power, a bi-convex lens $L_5$ which is made of a glass, has an Abbe number of 70 or more, and has positive refractive power, and a bi-convex lens $L_6$ which is made of a glass, has positive refractive power, and has a small radius of curvature oriented toward the magnification side. The lenses from the lens $L_3$ to the lens $L_5$ constitute a cemented triplet lens.

The second lens group $G_2$ is configured to include a meniscus-shaped aspherical lens $L_7$ which is made of a plastic, has negative refractive power, and has a convex surface oriented toward the reduction side, a bi-concave lens $L_8$ which is made of a glass, has an Abbe number of 70 or more, has negative refractive power, and has a concave surface oriented toward the reduction side, a bi-convex lens $L_9$ which is made of a glass, has an Abbe number of 35 or less, has positive refractive power, and has a small radius of curvature oriented toward the magnification side, and a meniscus-shaped aspherical lens $L_{10}$ which is made of a plastic, has negative refractive power, and a convex surface oriented toward the magnification side.

The free-form-surface lens group 3 is configured to include a meniscus-lens-shaped free-form-surface lens $L_{11}$ which is made of a plastic and has a convex surface oriented toward the magnification side and a meniscus-lens-shaped free-form-surface lens $L_{12}$ which is made of a plastic and has a convex surface oriented toward the magnification side.

FIG. 3 illustrates lens data of the first embodiment. In a case where the position of the center of the radius of curvature is in the propagation direction, the radius of curvature is represented by a positive sign, and an interplanar distance indicates a distance on the optical axis from the vertex position of a plane to the vertex position of the next plane.

Eccentricity is a value of the Y-axis direction, and slant is rotation about the X axis in the YZ plane. The eccentricity and slant act in the order of eccentricity and slant on a plane. In "normal eccentricity", the next plane is disposed at the interplanar distance on a new coordinate system on which the eccentricity and slant act. On the other hand, "DAR" denotes decenter-and-return. The eccentricity and slant act on only the plane, but they do not affect the next plane. The glass named PMMA is an acrylic plastic.

FIG. 4 illustrates a free-form-surface coefficient defined by Mathematical Formula 1. The free-form-surface coefficient indicates a shape which is rotationally asymmetric with respect to each optical axis 9 (Z axis), and the shape is defined by a component of a conical term and components of XY polynomial terms. For example, in a case where X is of second order (m=2) and Y is of third order (n=3), the coefficient of $C_{19}$ having $j=\{(2+3)^2+2+3\times3\}/2+1=19$ corresponds to the free-form-surface coefficient. In addition, the position of each optical axis of the free-form-surface is defined by amounts of the eccentricity and slant in the lens data of FIG. 3.

FIG. 5 illustrates an aspherical coefficient defined by Mathematical Formula 2. The aspherical coefficient indicates a shape which is rotationally symmetric with respect to each optical axis (Z axis), and the shape is defined by a component of a conical term and components of even orders of fourth order to twentieth order of a height h from the optical axis.

An odd-order polygonal aspherical coefficient illustrated in FIG. 6 indicates a shape where an odd-order component is added to the aspherical coefficient of FIG. 5. Since the height h is a positive value, the coefficient indicates a shape which is rotationally symmetric.

A lens configuration of the first embodiment will be described with reference to FIGS. 7 to 9. First, the lens $L_1$ will be described with reference to FIG. 7. FIG. 7(A) illustrates an example where a lens $L_{201}$ is used instead of the lens $L_1$ for comparison, and FIG. 7(B) illustrates an example where the lens $L_1$ is used.

Video light emitted from the video display element 5 is refracted by the lens $L_{201}$ disposed at the distance of BFL. In this case, the main plane (indicated by a dotted line) of the bi-convex lens is located inside the bi-convex lens. On the other than, the main plane of the lens $L_1$ which is a plano-convex lens is located in the convex surface portion of the plano-convex lens. Namely, since the plano-convex lens can secure a sufficient BFL and can refract the video light early due to the difference in the main plane in comparison with the bi-convex lens, the ray height following the subsequent lens $L_2$ can be reduced, so that the plano-convex lens is advantageous to miniaturization of the projection optical system 1. In addition, in order to reduce aberration caused by the lens $L_1$, a glass having a refractive index of 1.8 or more, in the first embodiment, FDS90 (HOYA) is applied to the lens $L_1$.

If a ray height Hm of an axial ray (marginal ray), a ray height Hp of a chief ray (principle ray), a refractive power $\phi$ (=a reciprocal of a focal length) of each lens, and an Abbe number $\nu$ of each lens illustrated in FIG. 24 are used, axial chromatic aberration and magnification chromatic aberration can be defined by the following Equations.

Axial Chromatic Aberration=$\Sigma(Hm_i^2\phi_i/\nu_i)$

Magnification Chromatic Aberration=$\Sigma(Hm_iHp_i\phi_i/\nu i)$

Refractive Power=$\Sigma(Hm_i\phi_i)$

For example, in a case where convex and concave lens balls are disposed at a distance of 0, the ray heights are the same. Therefore, the condition of the color correction becomes "$\phi_1/\nu_1+\phi_2/\nu_2=0$", and the condition of the refractive power becomes "$\phi=\phi_1+\phi_2$". Herein, if a positive lens group in the retrofocus of FIG. 24 is assumed and the refractive power of the entire optical system is set to positive, in general, a glass having a large Abbe number is applied to the convex lens, and a glass having a small Abbe number is applied to the concave lens.

However, a glass having a larger refractive power was applied to the lens $L_1$ of the first embodiment, and as a result, the Abbe number was reduced. Therefore, glasses having an Abbe number of 70 or more were applied to the convex lenses of the lens $L_3$, the lens $L_4$, and the lens $L_5$, and glasses having an Abbe number of 25 or less were applied to the concave lenses. Next, in order to correct the chromatic aberration caused by the lens $L_1$, the refractive power of each of the lens balls of the lens $L_3$, the lens $L_4$, and the lens $L_5$ was allowed to be increased. The larger refractive power is provided, and thus, larger aberration occurs in each lens ball. Therefore, if the lens $L_3$, the lens $L_4$, and the lens $L_5$ are configured to constitute a cemented triplet lens, it is possible to prevent aberration from occurring while correcting the chromatic aberration.

In addition, the lens $L_2$ is an aspherical lens which is made of a plastic, and the refractive power of the lens $L_2$ is set to be small in order to reduce a change in refractive power of the plastic lens according to a change in temperature. Namely, since $\phi_2\approx0$, the influence to the chromatic aberration is small.

Figure 8:
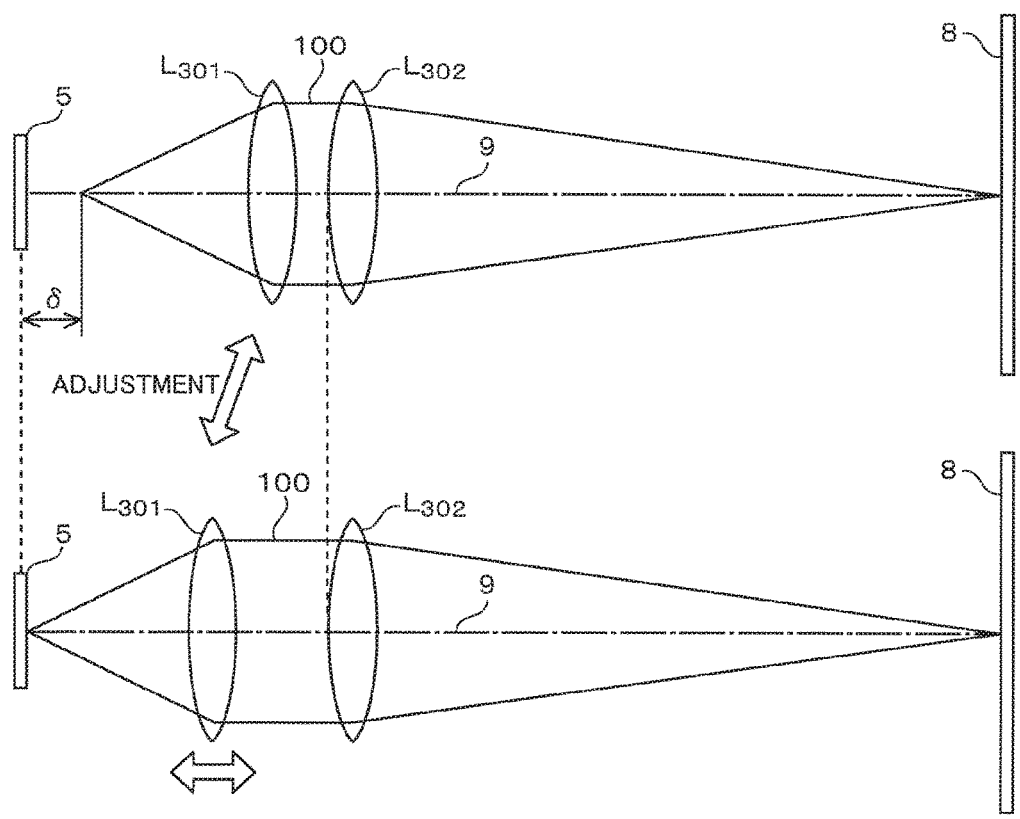
FIG. 8 is an explanatory diagram of flange back adjustment.
Figure 11:
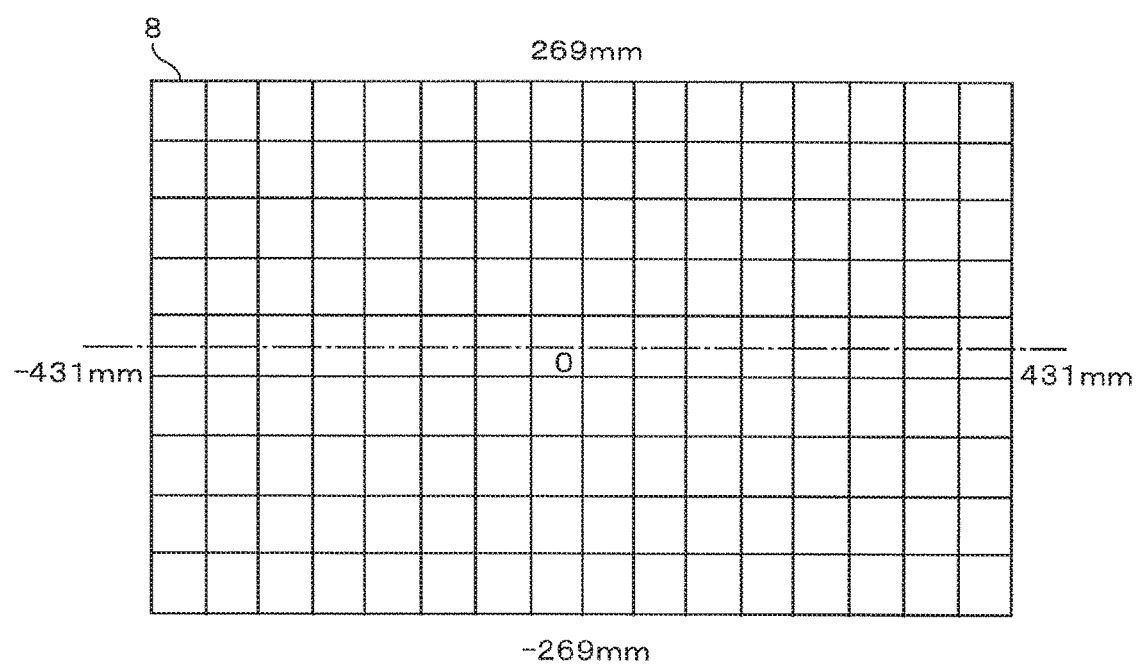
FIG. 11 is a diagram illustrating distortion aberration according to the first embodiment.

FIG. 8 is an explanatory diagram of flange back adjustment. In principle, the video display element 5 and the image plane 8 (screen) are to be in a conjugate relation with a projection optical system configured with a convex lens $L_{301}$ (corresponding to $L_1$ to $L_5$ in FIG. 1) and a convex lens $L_{302}$ (corresponding to $L_6$ in FIG. 1). However, if there is a position shift of the video display element 5 or the lens ball or an error in the radius of curvature of the lens ball in assembling processes, the conjugate relation of the video display element 5 and the image plane 8 is shifted.

Therefore, in FIG. 8, by moving the convex lens $L_{301}$ on the optical axis, a focused state can be obtained. In FIG. 8, since the axial ray between the convex lens $L_{301}$ and the convex lens $L_{302}$ is a substantially parallel ray 100, although the convex lens $L_{301}$ is allowed to be moved, the flange back adjustment can be performed without changing the focal length of the projection optical system 1.

In the projection optical system according to the present invention, although the flange back adjustment can be performed by moving the free-form-surface lens group 3 which is a focusing lens, for a reason (1) that a shift occurs in a moving range (adjustment range) of the original focusing lens and for a reason (2) that a part error of the coaxial system lens group 2 is preferably corrected by using the same lens group 2 in terms of optical performance, the first lens group $G_1$ having positive refractive power in the lens group 2 is divided into components having two refractive powers. More specifically, in FIG. 1, the lens group was divided into the lenses $L_1$ to $L_5$ and the lens $L_6$, and the flange back adjustment was performed by moving the lenses $L_1$ to $L_5$ on the optical axis.

Herein, since the aperture stop 7 is disposed between the lens $L_5$ and the lens $L_6$, the signs of the ray heights of the chief rays in the lens $L_5$ and the lens $L_6$ are opposite to each other. Herein, with respect to the above-described magnification chromatic aberration, since the functions of the lens $L_5$ and the lens $L_6$ are different, the Abbe number of the lens $L_5$ was set to 70 or more, and on the contrary, the Abbe number of the lens $L_6$ was set to 35 or less.

In general, if aspherical surfaces are effectively used, the number of lenses can be reduced, or an optical system having higher difficulty can be designed optically. However, in a case where any aspherical surface is not disposed in the optical system, the function of the aspherical surface cannot be expected.

Figure 2:
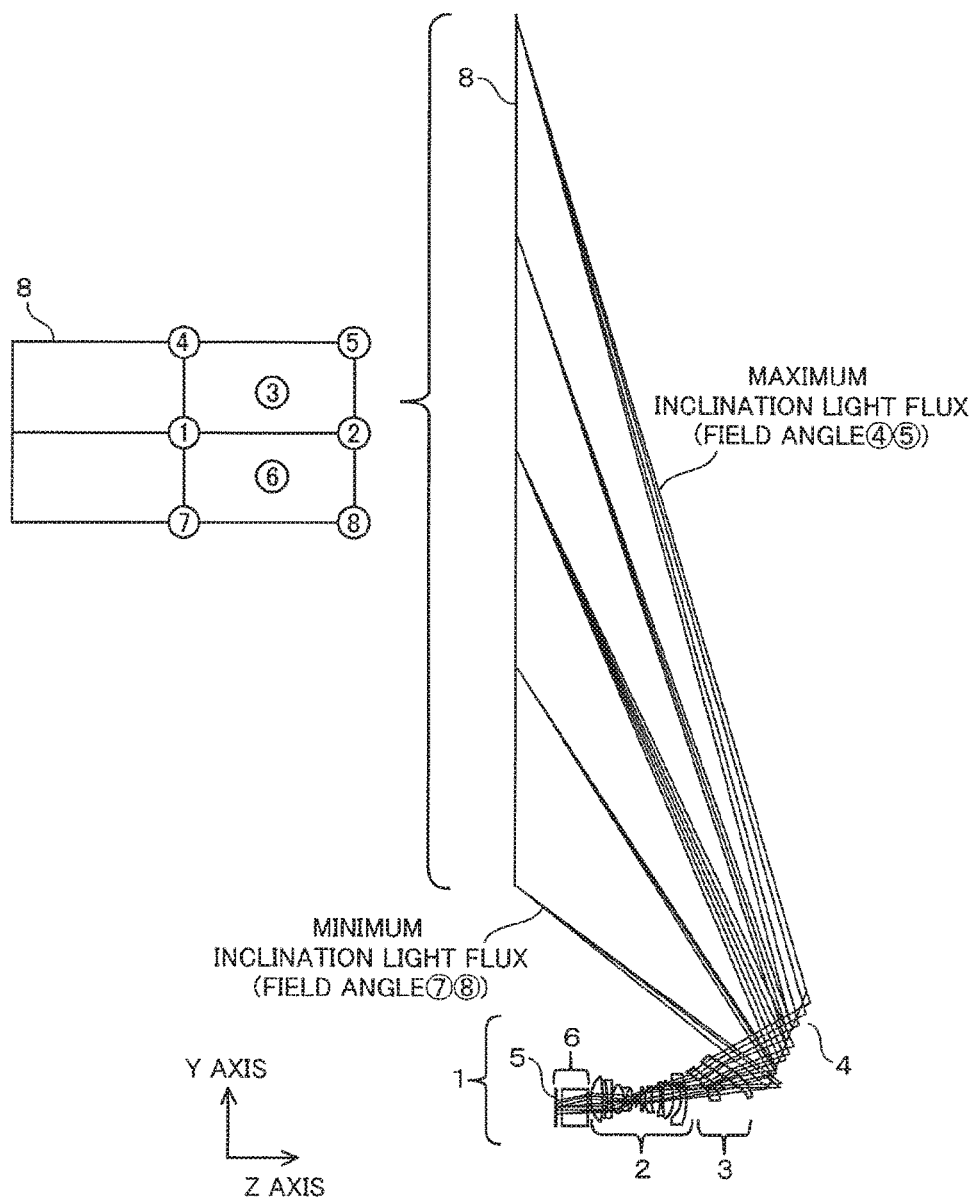
FIG. 2 is a diagram illustrating light rays of the projection optical system according to the first embodiment.

FIG. 9 illustrates a minimum inclination light flux, a maximum inclination light flux, an axial ray equivalent height, and a chief ray equivalent height. In light flux which is projected in an inclined manner on the image plane 8 in the YZ cross section, by using a pupil center beam $M_1$, an upper limit beam $M_2$, and a lower limit beam $M_3$ in the minimum inclination light flux M (light flux at a field angle 7 in FIG. 2) of which the incident angle is in minimum and a pupil center beam $P_1$, an upper limit beam $P_2$, and a lower limit beam $P_3$ in the maximum inclination light flux P (light flux at a field angle 4 in FIG. 2) of which the incident angle is in maximum, and the axial ray equivalent height was indicated by "$M_2-M_1$", and the chief ray equivalent height was indicated by "$P_1-M_1$".

In FIG. 9, the lens $L_7$ has small chief ray heights of 1.65 mm on the incident plane and 2.15 mm on the emitting plane, and thus, the lens $L_7$ mainly has an excellent correction function for spherical aberration. On the other hand, the lens $L_2$ has large negative chief ray height of −4.43 mm on the incident plane and −3.76 mm on the emitting plane, and thus, the lens mainly has an excellent correction function for peripheral aberration such as distortion aberration. Similarly, since the lens $L_{10}$ has a large chief ray equivalent height and has a positive value of 5.73 mm on the incident plane and 7.40 mm on the emitting plane, the lens is effectively combined with the aspherical correction function of the lens 2.

Next, FIG. 7 illustrates a focal length (=a reciprocal of refractive power) of each lens ball of the first embodiment. With respect to the focal length of 2.1 mm of the projection optical system 1 calculated by using projection magnification (=image size/object size) and a projection distance, it is found that the focal length of the plastic lens $L_2$ is −7137.9 mm and is 3000 times larger in absolute value, the focal length of the lens $L_7$ is −105.0 mm and is 50 times larger in absolute value, and the refractive power is sufficiently small.

As described above, since the refractive power of the lens $L_7$ is small, the lens $L_7$ is configured with a plastic lens having small refractive power, and the lens $L_8$ is configured with a glass lens having larger refractive power, so that the substantial lens length above described in FIG. 25 can be increased. This configuration is advantageous to the wide angle implementation.

The focal length of the plastic lens $L_{10}$ is −33.3 mm and is about 16 times larger, but the refractive power of the lens is larger in comparison with the lens $L_2$ and the lens $L_7$. This is because the axial ray equivalent height at the lens $L_{10}$ illustrated in FIG. 25 is as small as about 70% of the axial ray equivalent height of the lens $L_2$ and the lens $L_7$ and the axial ray equivalent height acts as a square thereof on the axial chromatic aberration so that the influence to the refractive power of the lens $L_{10}$ is small.

The lens group 2 has a retrofocus configuration where the focal length of the first lens group $G_1$ is 21.2 mm and the focal length of the second lens group $G_2$ is −50.0 mm. In the triplet lens configured by cementing the lens $L_3$, the lens $L_4$, and the lens $L_5$, the focal lengths of the lens balls have small values of 14.5 mm, −5.6 mm, and 12.2 mm and have large refractive powers. However, the focal length of the entire triplet lens is −235.6 mm, and the refractive power is negative. Namely, the absolute value of the ratio $f_1/f_{L3L4L5}$ of the focal length $f_{L3L4L5}$ of the entire triplet lens and the focal length $f_1$ of the entire lens group 2 was 0.2 or less.

As optical performances of the first embodiment, FIG. 8 illustrates distortion performance, FIG. 9 illustrates a lateral aberration diagram, and FIG. 10 illustrates a spot diagram. It can be understood from the figures that good optical performance is achieved.

In first embodiment, since the projection distance A was 172.2 mm and the length $W_8$ of the long side of the projection image was 861.4 (diagonal length: 40 inches), the projection ratio was 0.2 (=$A/W_8$), so that the wide angle implementation was achieved. In addition, since coaxial system lens group length B was 52.4 mm and the length $W_5$ of the long side of the image effective range of the video display element 5 was 9.8 mm, the reduced coaxial system lens length was 5.4 (=$B/W_5$), so that the miniaturization was achieved. A product of the projection ratio of 0.2 and the reduced coaxial system lens length of 5.4 was 1.07. A small value of the product was achieved.

On the other hand, in the projection optical system of Patent Literature 1, by dividing the projection distance A of 500 mm by the length $W_8$ of 1706 (diagonal length: 80 inches) of the long side of the projection image, the projection ratio of 0.3 (=$A/W_8$) is obtained, and by dividing the coaxial system lens group length B of 91.1 mm by the length $W_5$ of 13.44 mm of the long side of the image effective range of the video display element 5, the reduced coaxial system lens group length of 6.8 (=$B/W_5$) is obtained. The product of the projection ratio of 0.3 and the reduced coaxial system lens group length of 6.8 is 1.99.

Second Embodiment

Figure 14:
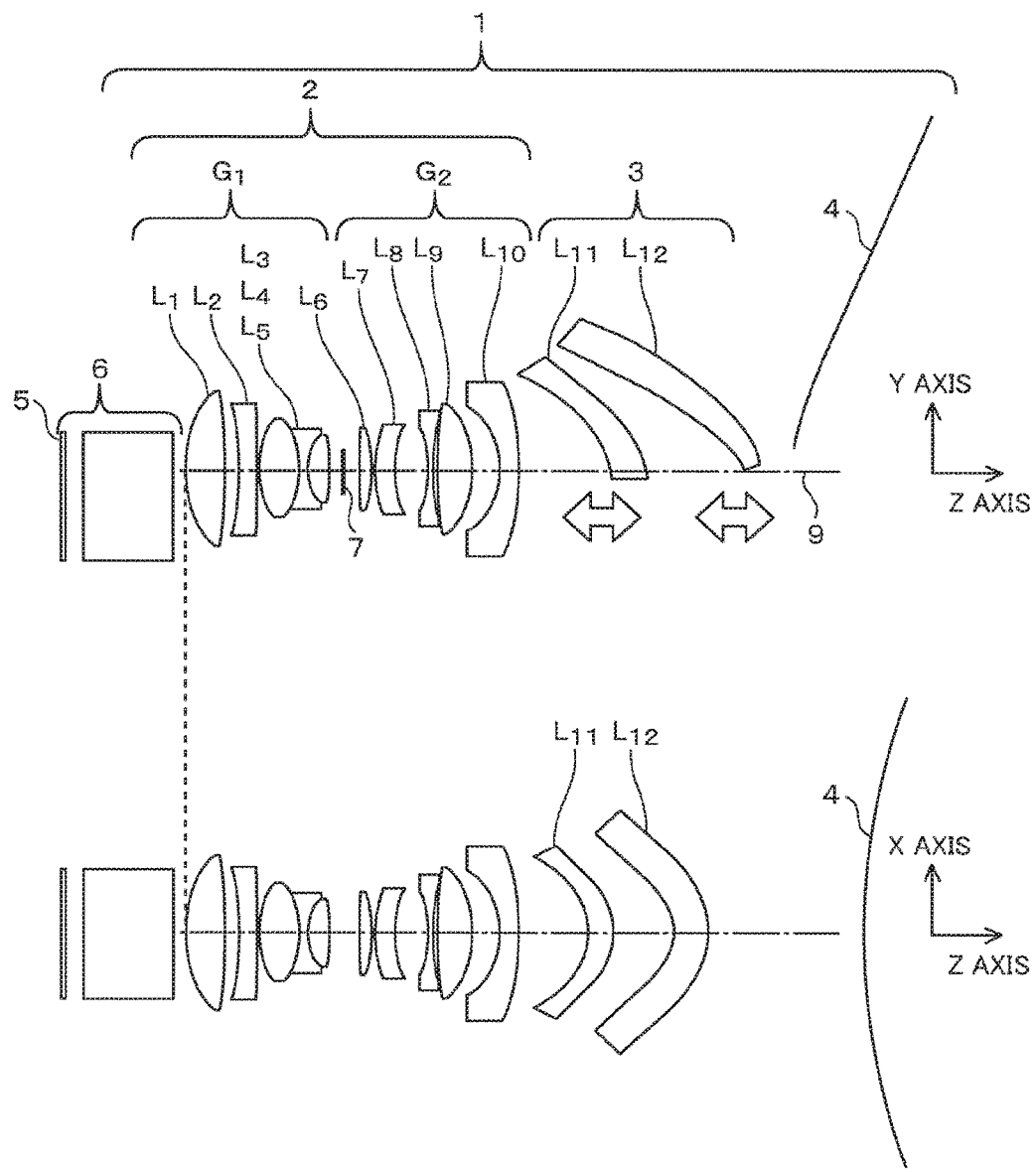
FIG. 14 is a diagram illustrating a configuration of a projection optical system according to a second embodiment.
Figure 22:
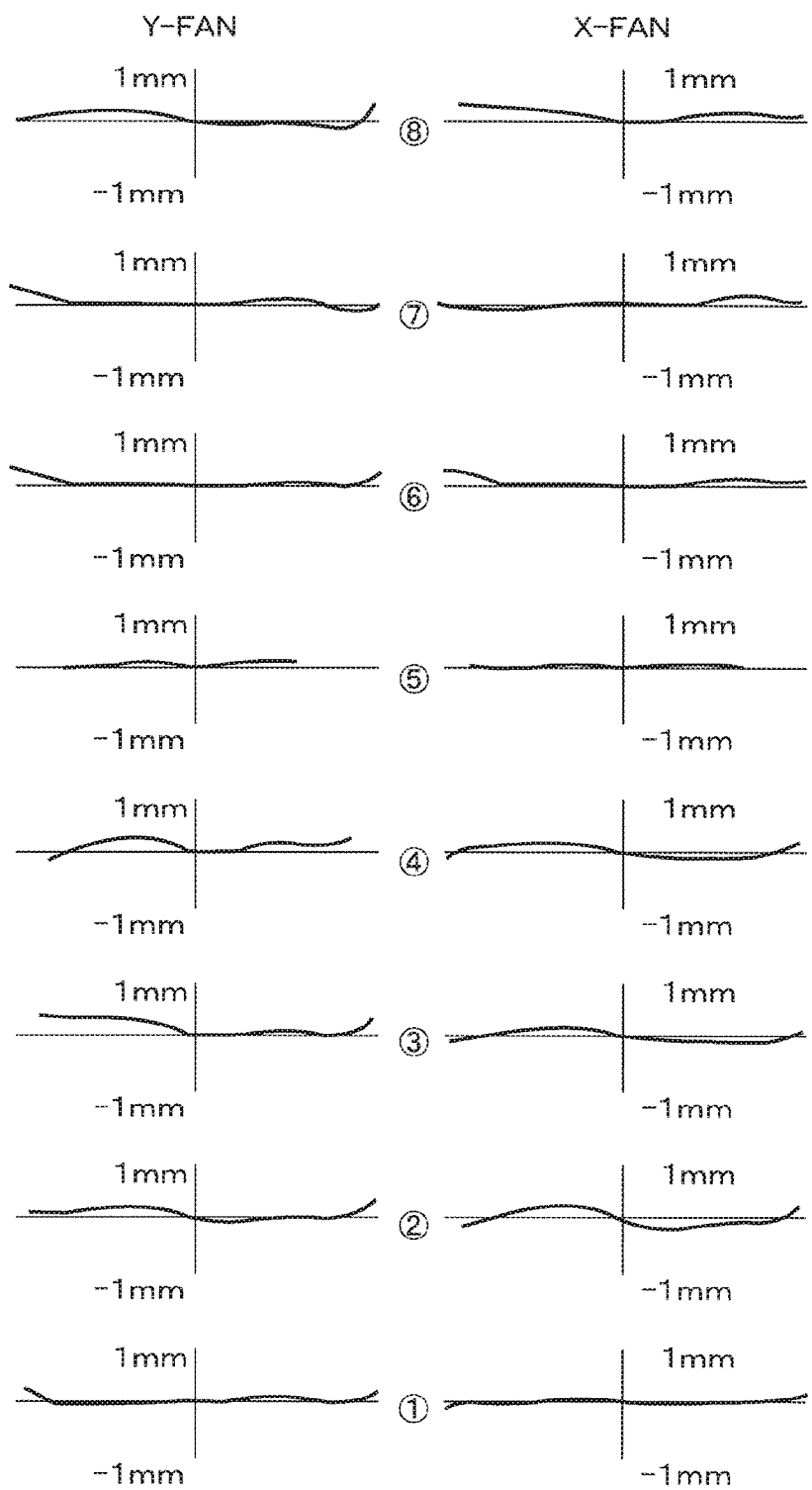
FIG. 22 is a diagram illustrating lateral aberration according to the second embodiment.
Figure 23:
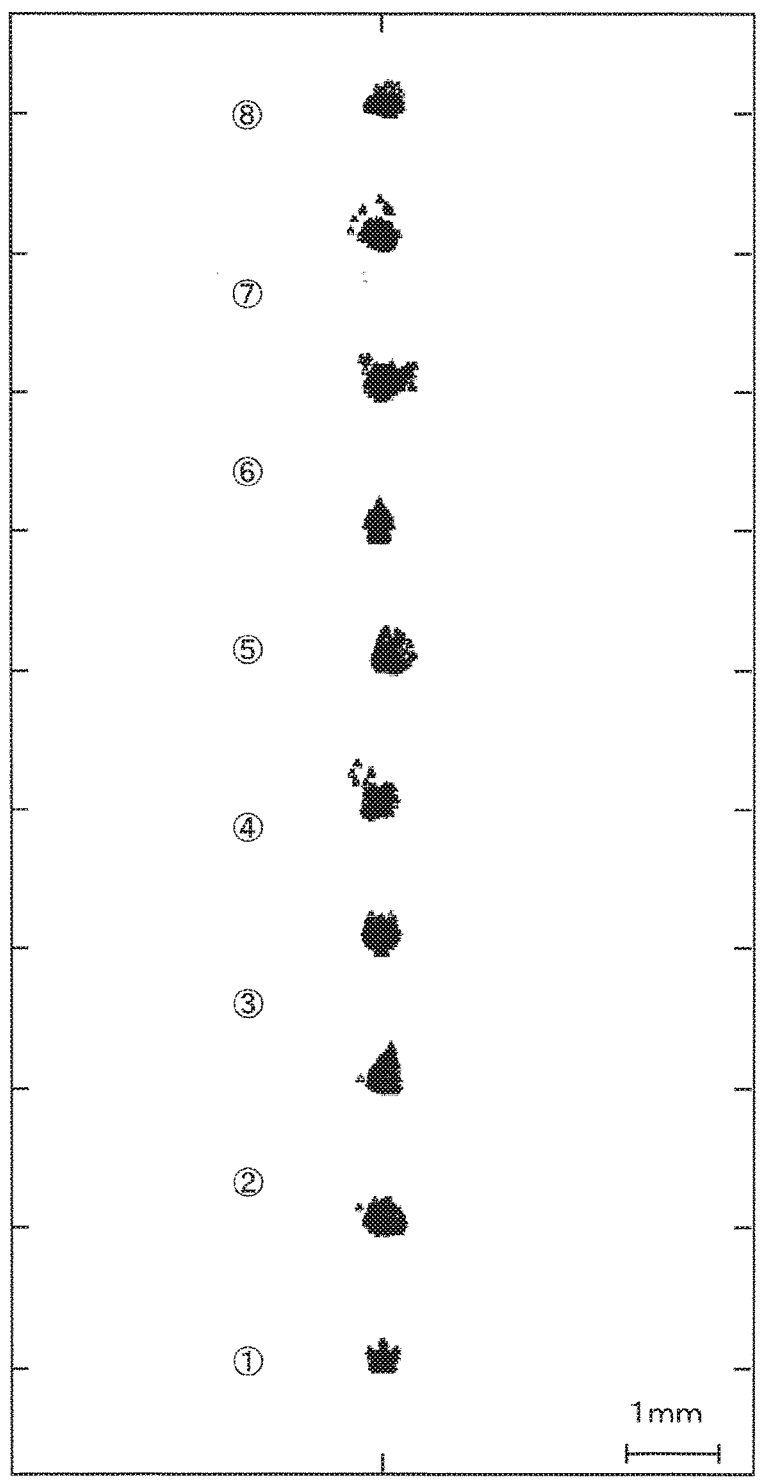
FIG. 23 is a spot diagram according to the second embodiment.

A second embodiment will be described with reference to FIGS. 14 to 23. FIG. 14 is a diagram illustrating a configuration of a projection optical system according to the second embodiment. FIG. 15 is a diagram illustrating light rays according to the second embodiment. In addition, FIG. 16 is a diagram illustrating lens data (glass named PMMA is an acrylic plastic, ZEONEX_K26R is a plastic material produced by ZEON) according to the second embodiment. FIG. 17 is a diagram illustrating free-form-surface coefficients according to the second embodiment. FIG. 18 is a diagram illustrating aspherical coefficients according to the second embodiment. FIG. 19 is a diagram illustrating odd-order polygonal aspherical coefficients according to the second embodiment. FIG. 20 is a diagram illustrating focal lengths (=reciprocals of refractive powers) of lens balls according to the second embodiment. FIG. 21 is a diagram illustrating distortion performance according to the second embodiment. FIG. 22 is a diagram illustrating lateral aberration according to the second embodiment. FIG. 23 is a spot diagram according to the second embodiment. It can be understood from these figures that good optical performance is achieved.

In the second embodiment, since the projection distance A was 172.6 mm and the length $W_8$ of the long side of the projection image was 888.7 (diagonal length: just over 40 inches), the projection ratio was 0.2 (=$A/W_8$), so that the wide angle implementation was achieved. In addition, since the length B of the coaxial system lens group was 52.7 mm and the length $W_5$ of the long side of the image effective range of the video display element 5 was 10.1 mm, the reduced coaxial system lens group length was 5.2 (=$B/W_5$), so that the miniaturization was achieved. The product of the projection ratio of 0.2 and the reduced coaxial system lens group length of 5.4 was 1.02. Such a small product as 1.5 or less was achieved.

According to the present invention described heretofore, it is possible to implement further reduction of a projection distance (wide angle implementation) and further miniaturization of a projection distance by using the necessary minimum number of lenses.

REFERENCE SIGN LIST

1: projection optical system
2: coaxial lens system
$G_1$: first lens group
$G_2$: second lens group
3: free-form-surface lens group
4: free-form-surface mirror
5: video display element
6: reduction filter
7: aperture stop
8: image plane
9: optical axis
$L_1$: first lens
$L_2$: second lens
$L_3$: third lens
$L_4$: fourth lens
$L_5$: fifth lens
$L_6$: sixth lens
$L_7$: seventh lens
$L_8$: eighth lens
$L_9$: ninth lens
$L_{10}$: tenth lens
$L_{11}$: first free-form-surface lens
$L_{12}$: second free-form-surface lens

The invention claimed is:

1. A projection-type video display device comprising:
a lens group which is disposed in a light propagation direction with respect to a video display element and includes a plurality of lenses;
a first free-form-surface lens which is disposed in the light propagation direction with respect to the lens group;
a second free-form-surface lens which is disposed in the light propagation direction with respect to the first free-form-surface lens; and
a free-form-surface mirror which reflects light emitted from the second free-form-surface lens to project the light on a screen in an inclined manner,
wherein the lens group includes, in order from a side close to the video display element, a first lens which has positive refractive power and a bi-convex shape of which a small radius of curvature is oriented toward the side close to the video display element, a second lens which has an aspherical shape, a third lens which has positive refractive power and a bi-convex shape, a fourth lens which has negative refractive power and a bi-concave shape, a fifth lens which has positive refractive power and a bi-convex shape, a sixth lens which has positive refractive power and a bi-convex shape of which a small radius of curvature is oriented toward a magnification side, a seventh lens which has negative refractive power and an aspherical meniscus shape of which a convex surface is oriented toward a reduction side, an eighth lens which has negative refractive power and a bi-concave shape, a ninth lens which has positive refractive power and a bi-convex shape of which a small radius of curvature is oriented toward the magnification side, and a tenth lens which has negative refractive power and an aspherical meniscus shape of which a convex surface is oriented toward the magnification side,
wherein the third, fourth, and fifth lenses constitute a cemented triplet lens, and
wherein the first and second free-form-surface lenses have a meniscus lens shape of which a convex surface is oriented toward the magnification side.

2. The projection-type video display device according to claim 1, wherein a refractive index of the first lens is larger than 1.8.

3. The projection-type video display device according to claim 1,
wherein an Abbe number of the third lens is larger than 70,
wherein an Abbe number of the fourth lens is smaller than 25,
wherein an Abbe number of the fifth lens is larger than 70, and
wherein an absolute value of a ratio $f_1/f_{L3L4L5}$ of a focal length $f_{L3L4L5}$ of the entire triplet lens and a focal length $f_1$ of the entire lens group is 0.2 or less.

4. The projection-type video display device according to claim 1, wherein an Abbe number of the sixth lens is smaller than 35.

5. The projection-type video display device according to claim 1, wherein a value $(A/W_8) \times (B/W_5)$ obtained by multiplying a projection ratio $(A/W_8)$ defined by a projection distance A of the projection-type video display device and a length $W_8$ of a long side of a projection image by a value $(B/W_5)$ obtained by normalizing a length B of the lens group with a length $W_5$ of a long side of an image effective range of the video display element is 1.5 or less.

* * * * *